United States Patent
Kodama et al.

(10) Patent No.: US 7,617,255 B2
(45) Date of Patent: Nov. 10, 2009

(54) STORAGE SYSTEM, STORAGE CONTROL DEVICE AND RECOVERY POINT DETECTION METHOD FOR STORAGE CONTROL DEVICE

(75) Inventors: Shoji Kodama, Sagamihara (JP);
Yusuke Nonaka, Sagamihara (JP);
Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 301 days.

(21) Appl. No.: 11/369,943

(22) Filed: Mar. 8, 2006

(65) Prior Publication Data
US 2007/0174354 A1    Jul. 26, 2007

(30) Foreign Application Priority Data
Jan. 25, 2006   (JP)   ............... 2006-015880

(51) Int. Cl.
*G06F 17/30* (2006.01)
*G06F 17/00* (2006.01)
(52) U.S. Cl. ............... 707/202; 707/203; 707/204
(58) Field of Classification Search .......... 707/200–206
See application file for complete search history.

(56) References Cited

U.S. PATENT DOCUMENTS

| 5,715,442 | A | * | 2/1998 | Ishida et al. ............. 707/1 |
| 5,724,581 | A | * | 3/1998 | Kozakura ............. 707/202 |
| 5,991,772 | A | * | 11/1999 | Doherty et al. ............. 707/202 |
| 6,611,850 | B1 | * | 8/2003 | Shen ............. 707/204 |
| 2002/0024535 | A1 | * | 2/2002 | Ueno et al. ............. 345/736 |
| 2002/0144129 | A1 | * | 10/2002 | Malivanchuk et al. ....... 713/188 |
| 2003/0018789 | A1 | * | 1/2003 | Ishiguro ............. 709/228 |
| 2003/0061456 | A1 | * | 3/2003 | Ofek et al. ............. 711/162 |
| 2003/0140051 | A1 | * | 7/2003 | Fujiwara et al. ............. 707/100 |
| 2003/0220950 | A1 | * | 11/2003 | Hiraoka et al. ............. 707/204 |

(Continued)

FOREIGN PATENT DOCUMENTS

EP    1465076 A2    2/2004

(Continued)

OTHER PUBLICATIONS

Lawrence Abrams, "Windows XP System Restore Guide", Apr. 2004, <http://www.bleepingcomputer.com/tutorials/tutorial56.html>.*

(Continued)

*Primary Examiner*—James Trujillo
*Assistant Examiner*—Dawaune Conyers
(74) *Attorney, Agent, or Firm*—Stites & Harbison PLLC; Juan Carlos A. Marquez, Esq.

(57) ABSTRACT

The present invention supports the selection of an appropriate recovery point, even if a point of recovery is unknown. The user issues a retrieval request from the host by specifying a recovery target file name (path name) and retrieval conditions (key word). The partial restoring processing section restores only a specified file out of the user data volume, and stores it in a temporary restoring area. The retrieval processing section detects a period where the restored file matches the retrieval conditions, and notifies the recovery point candidate list to the host. The user specifies one recovery point out of the recovery point candidates, and requests to restore the user data volume. By this, the user can acquire recovery point candidates based on a slight clue and select an appropriate recovery point.

9 Claims, 25 Drawing Sheets

U.S. PATENT DOCUMENTS

| | | | |
|---|---|---|---|
| 2003/0221064 A1* | 11/2003 | Honda et al. | 711/114 |
| 2004/0193945 A1* | 9/2004 | Eguchi et al. | 714/6 |
| 2004/0236984 A1* | 11/2004 | Yamasaki | 714/6 |
| 2004/0254964 A1 | 12/2004 | Kodama et al. | |
| 2004/0260726 A1* | 12/2004 | Hrle et al. | 707/104.1 |
| 2004/0268067 A1 | 12/2004 | Yamagami | |
| 2005/0086192 A1 | 4/2005 | Kodama | |
| 2005/0273565 A1* | 12/2005 | Hirakawa et al. | 711/162 |

OTHER PUBLICATIONS

Partial European Search Report dated Apr. 27, 2009 in English.

* cited by examiner

STORAGE SYSTEM, STORAGE CONTROL DEVICE AND RECOVERY POINT DETECTION METHOD FOR STORAGE CONTROL DEVICE

BACKGROUND OF THE INVENTION

1. Field of the Invention

The present invention relates to a storage system, storage control device and a recovery point detection method for a storage control device.

2. Description of the Related Art

In order to efficiently manage a large volume of data, which constantly increases every day, a storage system, which centralizes and manages many data being distributed and managed by a plurality of computers, is in use. Here technology to manage journal data in case the user erases data by mistake and to recover user data up to an arbitrary point of time by journal data is known (Japanese Patent Application Laid-Open No. 2005-18738).

SUMMARY OF THE INVENTION

The prior art disclosed in the above document is effective when the user clearly knows the time for which data recovery is desired, but is not so convenient if the user does not know the time for which data recovery is desired. If the user clearly knows the time for which data recovery is desired, it is easy to recover the user data up to this explicit point for which recovery is desired.

However in many cases the user may not know the time for which data is recovered. Except for the case when the user deleted a file currently being worked on by mistake, it takes time to recover a file which is not normally used up to the point of time desired by the user. To recover the volume to the status at the specified point of time, many journal data must be sequentially applied to the data group to be the reference.

The user must execute the recovery operation for the entire volume many times while repeatedly specifying the estimated recovery time until the desired result is acquired. So even if the user has a general idea of the contents to be recovered, it is rare that the user specifically knows the exact point for which data is recovered. Therefore the user must execute the recovery operation for a plurality of times and confirm the result until the desired result is acquired, which is not convenient to use.

With the foregoing in view, it is an object of the present invention to provide a storage system, storage control device and a recovery point detection method for a storage control device for detecting a point of time that satisfies the desired conditions of the user relatively easily. It is another object of the present invention to provide a storage system, storage control device and a recovery point detection method for a storage control device for presenting a point of time that satisfies the desired conditions of the user, and having the user recover the stored contents of the data volume up to the specified point of time. Other objects of the present invention shall be clarified by the later mentioned description of the embodiments.

To achieve the above embodiments, a storage system according to one aspect of the present invention is a storage system comprising a host computer and a storage control device for providing a data volume to this host computer, wherein the host computer comprises a retrieval request issuing section for issuing a retrieval request for specifying at least a restoring target range and retrieval conditions, and the storage control device comprises: an update history management section for managing the update history of the data volume; a first restoring section for restoring data in the restoring target range out of data stored in the data volume for each of the update history, and storing the data in a temporary restoring area when the retrieval request is received; and a retrieval section for judging whether the data restored in the temporary restoring area matches the retrieval conditions, detecting a period where the restored data continuously matches the retrieval conditions, and notifying the host computer of results.

In an embodiment of the present invention, the host computer further comprises a restoring request issuing section for specifying a predetermined point of time included in the period notified from the retrieval section, and issuing a restoring request for restoring the stored contents of the data volume to the status in the predetermined point of time, and the storage control device further comprises a second restoring section for restoring the stored contents of the data volume to the status in the predetermined point of time by using the update history when the restoring request is received.

In an embodiment of the present invention, the update history management section manages the stored contents of the data volume, for each of a plurality of specified generations, and if a restoring target period is included in the retrieval request, the first restoring section restores the data in the restoring target range in the restoring target period out of the volume for each of the update history, and stores the data in the temporary restoring area.

In an embodiment of the present invention, the host computer can access the data restored in the temporary restoring area.

In an embodiment of the present invention, the storage control device can send the data restored in the temporary restoring area to the host computer.

In an embodiment of the present invention, the retrieval section notifies a start time, when the data restored in the temporary restoring area matches the retrieval conditions the first time, and an end time, when the data in the temporary restoring area matches the retrieval conditions the last time, to the host computer as the period.

In an embodiment of the present invention, if a plurality of periods, where the data restored in the temporary restoring area continuously matches the retrieval conditions, are detected, the retrieval section notifies all of the plurality of periods to the host computer.

In an embodiment of the present invention, if a plurality of restoring target ranges are specified in the retrieval request, the first restoring section provides the temporary restoring area for each of the plurality of restoring target ranges, and restores the data in the plurality of restoring target ranges respectively.

In an embodiment of the present invention, each time the host computer updates the data volume, the update history management section manages the data before the update in association with the update time.

In an embodiment of the present invention, the update history management section stores an images of the stored contents of the data volume in at least one or more check points specified periodically or non-periodically, and manages the history of the updates performed from the check point to the next check point.

In an embodiment of the present invention, the update history management section manages the update history in file units, and the restoring target range can be specified in file units.

In an embodiment of the present invention, the update history management section manages the update history in file units, and the restoring target range can be specified in file units by the path information of the file.

In an embodiment of the present invention, the update history management section manages the update history in file units, and the restoring target range can be specified in file units by a hash value based on the path information of the file.

In an embodiment of the present invention, the restoring target range can be specified by a logical unit number, offset logical block address and data size.

In an embodiment of the present invention, the storage control device comprises: a first controller for accepting an access request from the host computer in file units, and converting the access request in file units into an input/output request in block units; and a second controller for transmitting/receiving data to/from a plurality of storage drives based on an input/output request which is input from the first controller in block units, the first controller comprises: the first restoring section; the retrieval section; an update history acquisition section for acquiring the update history where the first restoring section is managed by the update history management section; and the temporary restoring area, and the second controller comprises the update history management section.

A storage control device according to another aspect of the present invention is a storage control device for providing a data volume to a host computer, comprising: an update history management section for managing the update history of the data volume; a first restoring section for restoring data in the restoring target range out of the data volume for each of the update history and storing the data in a temporary restoring area when a retrieval request including at least a restoring target range and retrieval conditions is received from the host computer; and a retrieval section for judging whether the data restored in the temporary restoring area matches the retrieval conditions, detecting a period where the restored data continuously matches the retrieval conditions, and notifying the host computer of results.

A storage control device according to still another aspect of the present invention is a storage control device for providing a data volume to a host computer, comprising a controller, and a storage drive which is controlled by the controller and which provides a storage area to install the data volume, wherein the controller comprises: an access request processing section for performing file access to the data volume according to a file access request from the host computer; a journal creation processing section for managing the update history by storing data before the update in a journal volume, and storing the update time and a position where the data before the update is stored in the journal volume as journal management information if the host computer requests an update of a file stored in the data volume; a first restoring section for restoring the restoring target file out of a file group stored in the data volume based on the journal management information and the journal volume for each update history and storing the restored data in a temporary restoring area if a retrieval request, including at least information for specifying a restoring target file and retrieval conditions which the restoring target file must satisfy, is issued from the host computer; a retrieval section for judging whether the file restored in the temporary restoring area matches the retrieval conditions, detecting a period where the restored file continuously matches the retrieval conditions and notifying the host computer of results; and a second restoring section for restoring the stored contents of the data volume to the status at a predetermined point of time based on the journal management information and journal volume if the host computer requested to restore the stored contents of the data volume by specifying a predetermined point of time included in a period continuously matching the retrieval conditions.

In another embodiment of the present invention, the host computer issues the retrieval request in a predetermined case, and the predetermined case includes at least one of a case when the restoring target file is infected with a computer virus, a case when the restoring target file is lost, and a case when the restoring target file is updated.

A recovering point detection method for a storage control device according to another aspect of the present invention is a method for detecting a recovery point using a storage control device for providing a data volume to a host computer, comprising: a first step of judging whether a retrieval request including at least a restoring target range and retrieval conditions is issued from the host computer; a second step of securing a temporary restoring area in the storage area when judged that the retrieval request is issued in the first step; a third step of sequentially acquiring the update history information for managing the history of the update of the data volume by the host computer from the older history, and judging whether data on the acquired update history information is included in the restoring target range; a fourth step of reading the data on the update history information from a volume for update data management, and storing the data in the temporary restoring area when the data on the acquired update history information is included in the restoring target range; a fifth step of judging whether the data stored in the temporary restoring area matches the retrieval conditions; a sixth step of storing the update time when the data is updated in an update time storing area when the data stored in the temporary restoring area matches the retrieval conditions; and a seventh step of reading the update time stored in the update time storage area and sending this update time to the host computer as a recovery point.

All or a part of the means, functions and steps of the present invention may be implemented as a computer program to be executed by a computer system. If all or a part of the configuration of the present invention is implemented as a computer program, this computer program can be stored in various storage media and distributed, or can be transmitted via a communication network.

DESCRIPTION OF THE PREFERRED EMBODIMENTS

Figure 1:
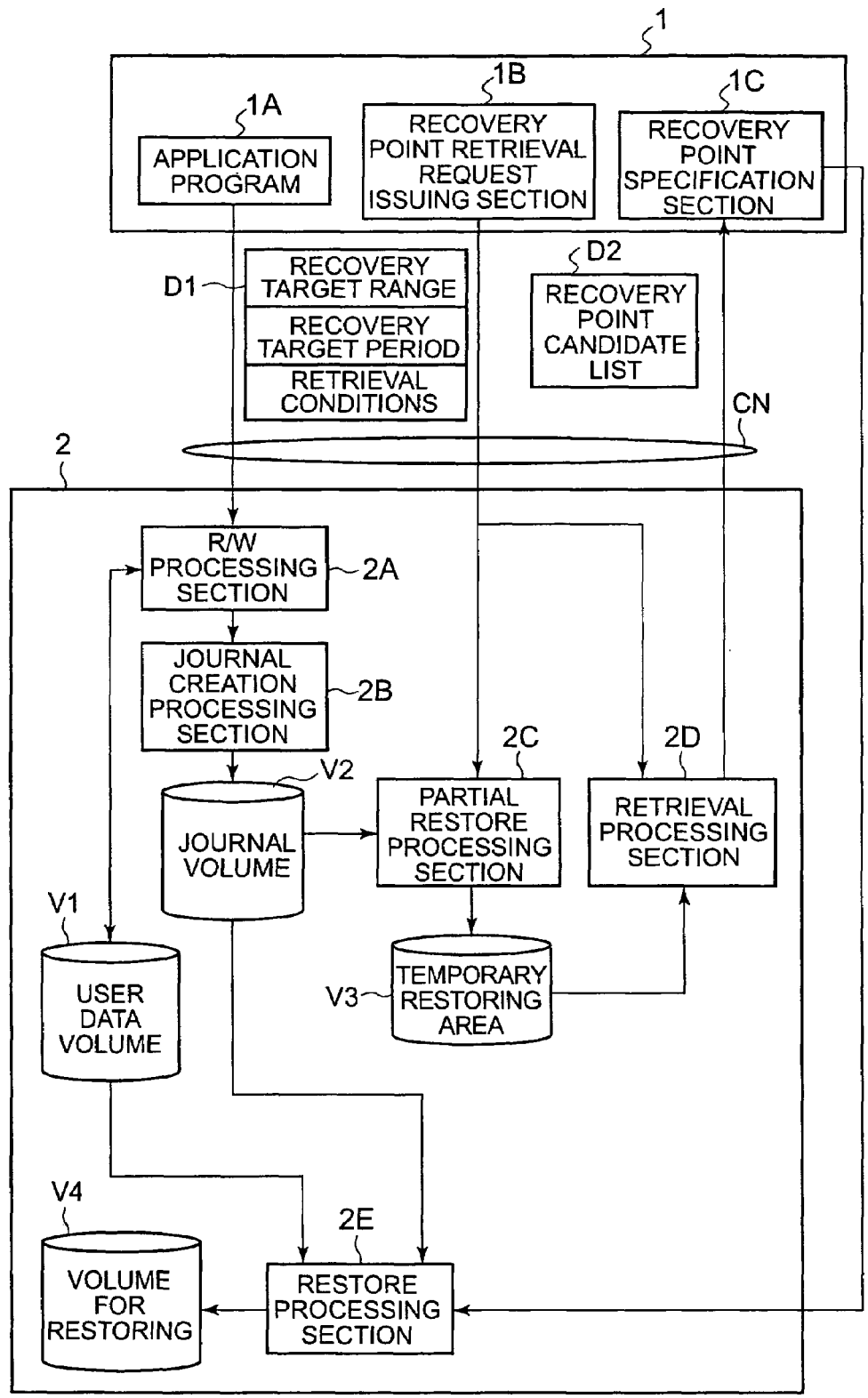
FIG. 1 is a diagram depicting an overview of an embodiment of the present invention.

FIG. 1 is a diagram depicting the general configuration of an embodiment of the present invention. The storage system of the present embodiment comprises a host computer (hereafter "host") 1 and a storage control device 2, which will be described later.

The host 1 is structured as a server computer or personal computer, for example, and is connected to the storage control device 2 via a communication network CN so that bidirectional communication can be performed. The host 1 may comprise an application program 1A, a recovery point retrieval request issuing section 1B, and a recovery instruction section 1C, for example.

The application program 1A is a program used for various operations of the user, such as a data base, electronic mail management program, client management program and sales management program.

The recovery point retrieval request issuing section (hereafter may be called "retrieval request issuing section") 1B corresponds to the "retrieval request issuing section". The retrieval request issuing section 1B is for issuing a retrieval request D1 for retrieving a recovery point desired by the user. This retrieval request D1 includes the recovery target range, recovery target period and retrieval conditions, for example. The retrieval request issuing section 1B is for issuing a request to search a recovery point desired by the user. Therefore the retrieval request issuing section 1B may be called the "recovery point searching request section", for example.

The recovery target range is, for example, file units (a file includes a directory) or block data units. By specifying a desired file name as the restoring target, the user can temporarily restore only the file, and search the recovery point.

For the recovery target period, update history management units can be specified. For example, if the update history of the user data volume V1 is managed in such management units as day units, week units or month units, the user can request a search of the recovery point by specifying a desired period or a desired date and time.

The retrieval conditions are such conditions as key word, time stamp, and the entire contents of a file. For example, by specifying the inclusion of a predetermined key word as a retrieval condition, the user can confirm the period when the restore target file includes the predetermined key word (recovering point candidate).

The recovery instruction section 1C corresponds to the "restoring request issuing section". The recovery instruction section 1C is for specifying a recovery point from the recovery point retrieval result (recovery point candidates) D2 and restoring the stored contents of the user data volume V1.

The storage control device 2 is structured as a disk array device, for example. The storage control device 2 comprises, for example, an R/W processing section 2A, a journal creation processing section 2B, a partial restore processing section 2C, a retrieval processing section 2D, a restore processing section 2E, a user data volume V1, a journal volume V2, a temporary restoring area V3, and a volume for restoring V4.

The R/W processing section 2A is for processing an access request (read request and write request) from the host 1. When a read request is issued from the host 1, the R/W processing section 2A reads the requested data from the user data volume V1, and sends it to the host 1. When a write request is issued from the host 1, the R/W processing section 2A writes the write data to the user data volume V1.

The journal creation processing section 2B corresponds to the "update history management section". The journal creation processing section 2B is for managing the update history of the user data volume V1. The journal creation processing section 2B generates journal data each time a write request is issued from the host 1, and stores this journal data in the journal volume V2. For example, the journal creation processing section 2B saves the data before the update to the journal volume V2, and corresponds the saved time (that is the update time) of this data and the saved location (storage destination address in the journal volume V2) for management.

The partial restore processing section 2C corresponds to "the first restoring section". The partial restore processing section 2C partially restores the stored contents of the user data volume V1 based on the retrieval request D1 issued from the retrieval request issuing section 1B. In other words, the partial restore processing section 2C restores only the data belonging to the restoring target range in the retrieval request D1 for each update history, and stores the restoring result in the temporary restoring area V3. For example, if a specific file is specified as the restore target range, the partial restore processing section 2C restores each update history on the specific file, like the oldest status in the history management, the status at the next update, and the latest status in the history management.

The retrieval processing section 2D corresponds to the "retrieval section". The retrieval processing section 2D detects the update time of the data matching the retrieval conditions in the retrieval request D1 for the restored data stored in the temporary restoring area V3. Based on the update time of the data matching the retrieval conditions, the retrieval processing section 2D creates the recovery point candidate list D2, and sends it to the host 1. The retrieval processing section 2D specifies a period where the recovery target file continuously matches the retrieval conditions in the retrieval request D1, and notifies this specified period to the host 1 as the recovery point candidate list D2.

The restore processing section 2E corresponds to the "second restoring section". The restore processing section 2E restores the stored contents of the user data volume V1 up to the recovery point specified by the recovery instruction section IC. The restore processing section 2E sequentially applies the journal data managed by the journal volume V2 to the stored contents of the user data volume V1, and stores this application result to the volume for restoring V4. By this, the stored contents of the specified recovery point is restored in the volume for restoring V4. And by switching the access destination of the host 1 from the user data volume V1 to the volume for restoring V4, the application program 1A of the host 1 can use the data recovered at the point of time desired by the user.

Figure 2:
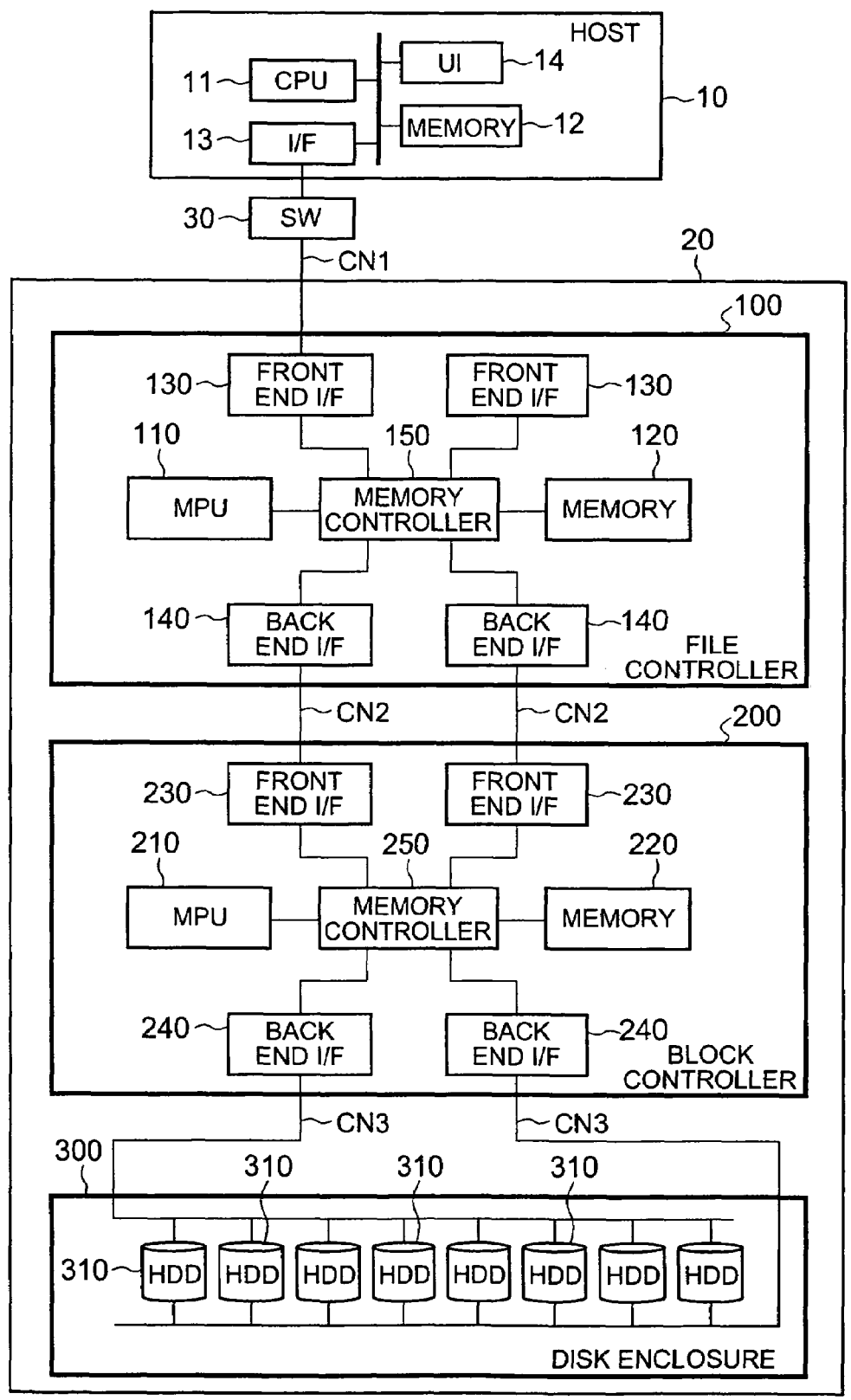
FIG. 2 is a diagram depicting the hardware configuration of the storage system.

The storage control device 2 has a plurality of storage drives in either one or both of inside and outside the body (see FIG. 2). Each storage drive is structured as a hard disk drive or a semiconductor memory drive, for example. By collecting a predetermined number of storage areas of each storage drive, a virtual physical storage device can be acquired. And in this physical storage device, each volume, V1, V2, V3 and V4, which are logical storage devices, can be installed respectively.

The user data volume V1 is for storing the user data to be used by the application program 1A. The journal volume V2 is for storing the update history of the user data volume V1 as the journal data.

The temporary restoring area V3 is used for partial restore processing by the partial restore processing section 2C. The temporary restoring area V3 may be generated using the storage area of the storage drive, or may be generated using the storage area of the memory of the storage control device 2. The volume for restoring V4 is used by the restore processing section 2E. In the volume for restoring V4, the stored contents of the user data volume V1 at the recovery point specified by the user is reproduced.

Now the functions of the present embodiment will be described. When the application program 1A updates the data of the user data volume V1, the journal creation processing section 2B generates journal data for storing this update history. The generated journal data is stored in the journal volume V2.

Here the user may desire a stored contents at a predetermined point of time in the past. For example, the user may erase a necessary file by mistake. If the user clearly recognizes the timing (point) to be recovered, then the timing is specified as a recovery point, and the restore processing section 2E restores the data at this recovery point.

Whereas if the user does not clearly know the timing to be recovered, the user has the storage control device 2 search the timing to be recovered using separate information as a clue.

In other words, by specifying the recovery target range (e.g. name of the file of which recovery is desired), recovery target period (recovery point searching period) and retrieval conditions, the user can request a search of the recovery point. The search request of the recovery point is sent to the storage control device 2 as the retrieval request D1.

The partial restore processing section 2C does not restore the entire user data volume V1, but restores only a file specified by the user for each update history of the file.

Each restored file is stored in the temporary restoring area V3. The retrieval processing section 2D judges whether each of the restored files satisfies the retrieval conditions, and specifies the period matching the retrieval conditions. And the retrieval processing section 2D reports the period matching the retrieval conditions to the host 1 as the recovery point candidate list D2. The user selects a desired point of time from the reported recovery point candidate list D2 as a recovery point, and requests its restoring to the restore processing section 2E. The restore processing section 2E recovers the stored contents of the user data volume V1 up to the recovery point instructed by the user.

An example is given. It is assumed that the user deleted a document file named "2005 first half period report" by mistake. The user knows that the directory name to which the document file belongs to is "business related", but does not remember exactly when the document file was deleted.

In this case, the user specifies the directory name, "business related", to the restore target range, and the inclusion of the file name, "2005 first half period report", to the retrieval conditions. By this, the retrieval request issuing section 1B issues the retrieval request D1.

The partial restore processing section 2C restores only the file group included in the directory of "business related", which was specified as the restore target range, out of the many files stored in the user data volume V1, for each update history. The restored file group is stored in the temporary restoring area V3.

The retrieval processing section 2D detects only files including the key word "2005 first half period report" out of the file group stored in the temporary restoring area V3. And the retrieval processing section 2D detects that the file including the.key word "2005 first half period report" appears first on Oct. 1, 2005, and appears last on Nov. 30, 2005. The retrieval processing section 2D reports the first appearance point of time to the last appearance point of time to the host 1 as the recovery point candidate list D2.

The user refers to the recovery point candidate list D2, and specifies one point between the first appearance point of time to the last appearance point of time as the recovery point, and instructs the restoration of the user data volume V1. By this, the restore processing section 2E reproduces the storage contents at the point of time desired by the user in the volume for restoring V4.

As the later mentioned examples show, if it is not necessary to restore the entire user data volume V1, for example, the storage control device 2 can provide the files stored in the temporary restoring area V3 to the host 1.

Because of this configuration, in the present embodiment, the candidates of the appropriate recovery points can be presented using what little information the user remembers as a clue, even if the user does not recognize the point to be recovered. Therefore the user need not restore the entire user data volume V1 by trial and error, and can obtain the desired file relatively easily and quickly, so operation efficiency improves. Now the present embodiment will be described in detail.

EXAMPLE 1

An embodiment of the present invention will be described in detail. FIG. 2 is a block diagram depicting the hardware configuration of the storage system. This storage system comprises a host 10 and a storage control device 20. The host 10 and the storage control device 20 are connected via the communication network CN1 having a switch 30, so that bidirectional communication can be performed.

The communication network CN1 is, for example, a LAN (Local Area Network) using TCP/IP (Transmission Control Protocol/Internet Protocol), and a SAN (Storage Area Network) using FCP (Fibre Channel Protocol). The host 10 and the storage control device 20 may be directly connected without the switch 30 as the relay device.

The host 10 is structured as a computer device comprising a CPU (Central Processing Unit) 11, memory 12, communication interface ("I/F" in FIG. 2) 13, and user interface ("UI" in FIG. 2) 14, for example.

The memory 12 can comprises a ROM (Read Only Memory), RAM (Random Access Memory) and local disk, for example, In the memory 12, various programs, such as an OS (Operating System) and application programs, are stored. The CPU 11 reads the programs stored in the memory 12, and executes them to implement the functions of each program. The user interface 14 can comprise such information output devices as a display device and a speaker, and such an information input devices as keyboard switches, pointing devices and microphone.

The storage control device 20 can comprise a file controller 100, block controller 200, and disk enclosure 300. As later mentioned example show, the file controller 100 and block controller 200 may be integrated into one controller.

The file controller 100 corresponds to the "controller" or the "first controller". The file controller 100 is structured as a computer device for managing the data input/output in file units. The file controller 100 is connected with the block controller 200 via the communication path CN2 so that bidirectional communication can be performed. This communication path CN2 is, for example, a fiber cable (SAN) using FCP.

The file controller 100 comprises, for example, an MPU (Micro Processing Unit) 110, memory 120, front end interface (hereafter "interface" may be referred to as "I/F") 130, back end I/F 140 and memory controller 150.

The memory 120 can be comprised of semiconductor memories, such as ROM and RAM, for example, and stores various programs to be executed by the MPU 110. The memory 120 also has a cache area, and this cache area is used for data communication with the host 10 and block controller 200.

The front end I/F 130 is for performing data communication at the file level (data communication in file units) with the host 10. The back end I/F 140 is for performing data communication at the block level (data communication in block units) with the block controller 200. The memory controller 150 controls the internal communication paths so as to interconnect the MPU 110, each front end I/F 130, each back end I/F 140 and memory 120.

The write data received from the host 10 via the front end I/F 130 is stored once in the memory 120. And the back end I/F 140 converts the write destination address of the write data into a logical block address (LBA), then sends the write data to the block controller 200. The write data may be stored in the memory 120 after performing the address conversion by the front end I/F 130. The MPU 110 may perform address conversion.

The block data received from the block controller 200 via the back end I/F 140 is stored once in the memory 120. And the front end I/F 130 converts the logical block address into an address at the file level, and converts the data to file data, and sends this data to the host 10. The back end I/F 140 may convert the block data into file data, then the data may be stored in the memory 120. The MPU 210 may perform conversion processing to the file data.

The block controller 200 corresponds to the "controller" or the "second controller". The block controller 200 connects with the disk enclosure 300 via the communication path CN3 so that bidirectional communication can be performed. Just like CN2, the communication path CN3 is fiber cable (SAN) using FCP.

The block controller 200 is a computer device for managing data input/output in block units. Just like the file controller 100, the block controller 200 comprises an MPU 210, memory 220, front end I/F 230, back end I/F 240 and memory controller 250, for example.

In the memory 220, various programs to be executed by the MPU 210 are stored. Just like the above mentioned memory 120, the memory 220 also has a cache area. This cache area is used for data exchange with the file controller 100 and disk enclosure 300.

The front end I/F 230 is for performing data communication at the block level with the file controller 100. The back end I/F 240 is for performing data communication at the block level with the disk drive 310. The memory controller 250 controls the internal communication paths so as to interconnect the MPU 210, front end I/F 230, each back end I/F 240 and memory 220.

The write data received from the file controller 100 via the front end I/F 230 is stored once in the memory 220. And the back end I/F 240 converts the logical block address of the write data into the physical address of each disk drive 310, and writes it in a predetermined disk drive 310. The data read from the disk drive 310 is converted into a logical block address by the back end I/F 240, and is stored in the memory 220. The front end I/F 230 reads the data from the memory 220, and transfers it to the file controller 100.

The disk enclosure 300 can also be called the "storage device" or the "disk array storage device", for example. The disk enclosure 300 comprises a plurality of disk drives 310 disposed in arrays. These disk drives 310 correspond to the storage devices.

The disk drive 310 can be structured as various storage devices, such as a hard disk drive, semiconductor memory drive, optical disk drive, magneto-optical disk drive and magnetic tape drive. In the case of a hard disk drive, various types of hard disk drives can be used, such as an FC (Fibre Channel). disk, SATA (Serial AT Attachment) disk and SCSI (Small Computer System Interface) disk. In disk enclosure 300, different types of storage devices may coexist.

For example, one group is formed by a predetermined number (4 or 8) of disk drives 310. This group is called a "RAID" group or a parity group. Each disk drive 310 belonging to the RAID group provides a physical storage area respectively, and a set of physical storage areas is formed. Therefore the RAID group is also called a physical storage device. One or a plurality of disk drives 310, out of each disk drive 310 belonging to a group, is/are used for storing parity data, although this differs depending on the RAID level.

In the physical storage area of the RAID group, one or a plurality of logical volumes can be set. A logical volume is allocated to a port of a front end I/F 130 of the file controller 100, and is accessed by the host 10. The logical volume can be called a logical storage device.

Figure 3:
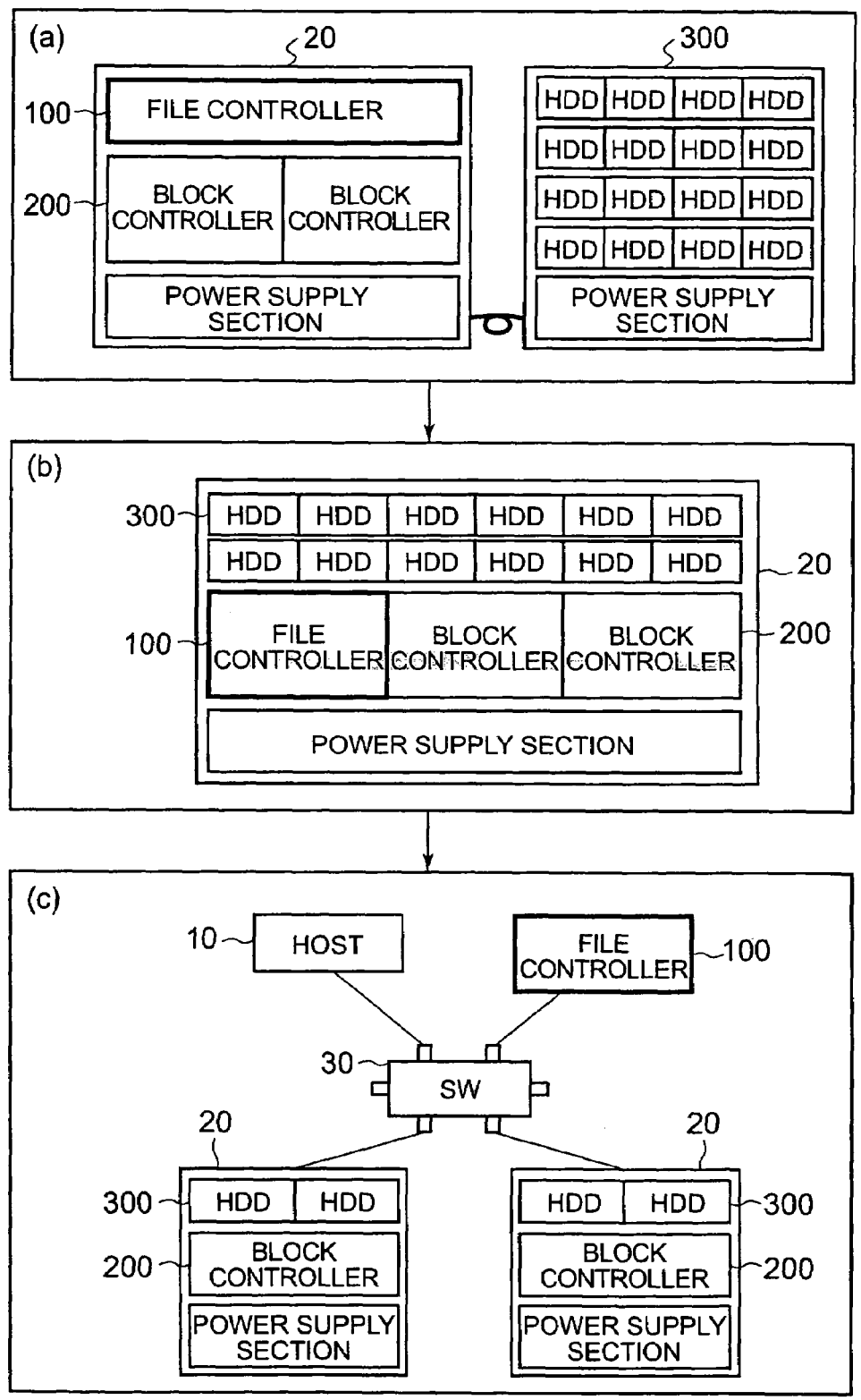
FIG. 3 is a diagram depicting a variant form of a file controller installation method.
Figure 4:
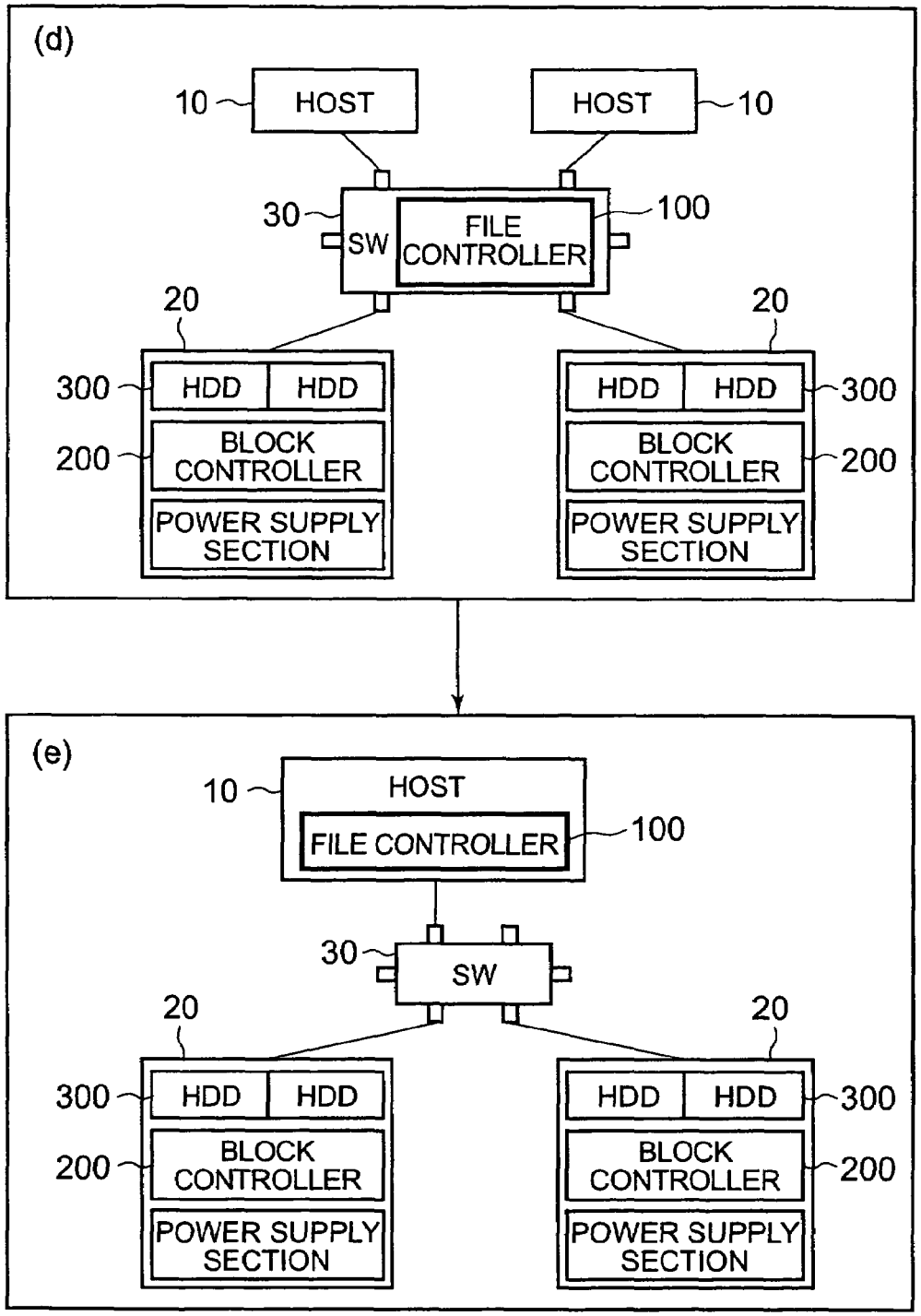
FIG. 4 is a diagram depicting a variant form of another file controller installation method.

Before describing the functional configuration or the storage system, the positional relationship of the file controller 100 and block controller 200 will be described with reference to FIG. 3 and FIG. 4. As FIG. 3A shows, the file controller 100 and block controller 200 are disposed in one body for control, the disk enclosure 300 is created as a separate body, and these bodies are connected via fiber cable.

As FIG. 3B shows, the file controller 100, block controller 200 and disk enclosure 300 may be disposed in one body. As FIG. 3C shows, the file controller 100 may be separated from the body of the storage control device 20, and the file controller 100, block controller 200 and disk enclosure 300 may be connected via a network.

As FIG. 4D shows, the file controller 100 may be separated from the body of the storage control device 20, and the file controller 100 may be disposed in the switch 30. Also as FIG. 4E shows, the file controller 100 may be disposed in the host 10.

Figure 5:
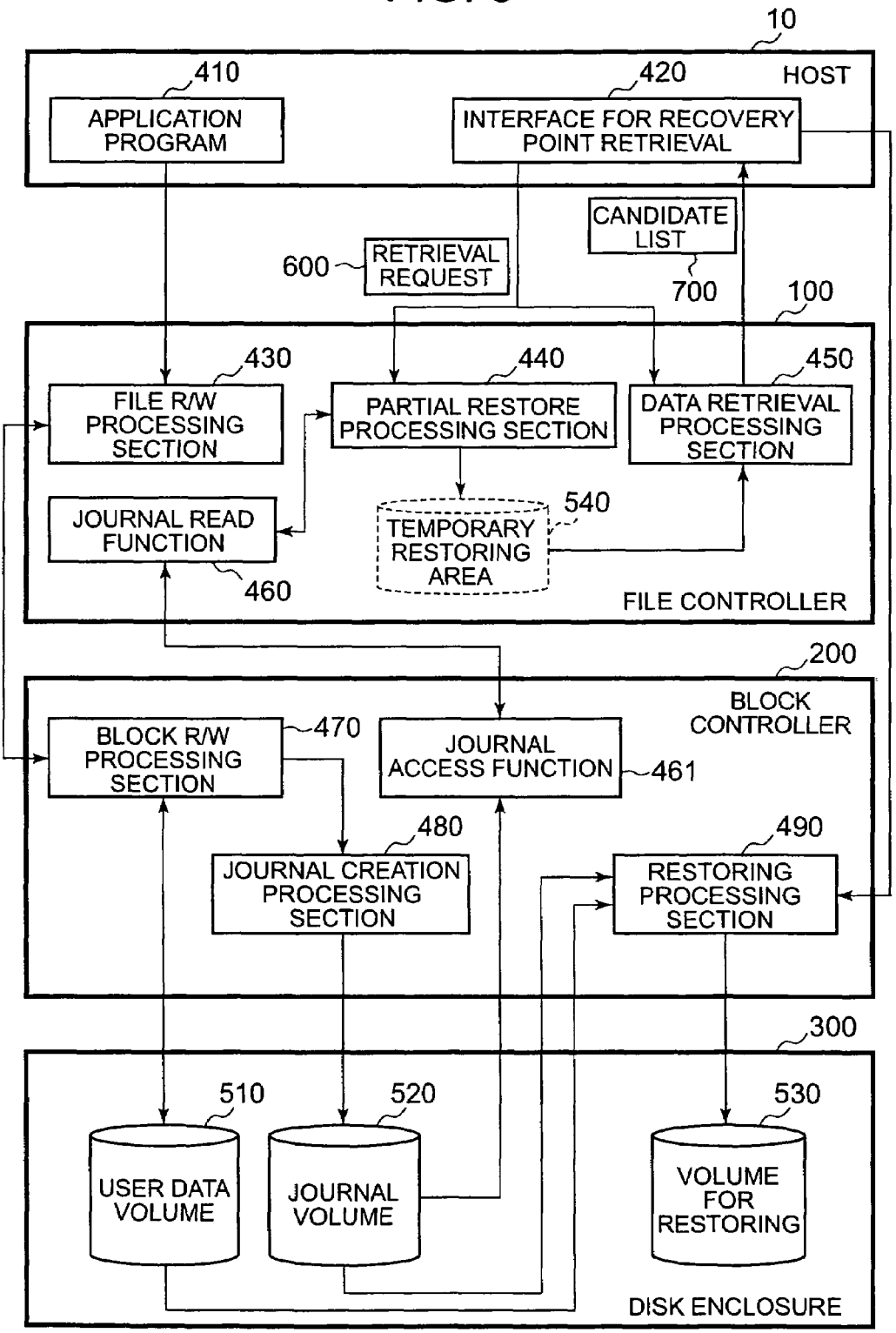
FIG. 5 is a diagram depicting the functional configuration of the storage system.

Now the functional configuration of the storage system will be described with reference to FIG. 5. The host 10 comprises an application program 410 and interface for recovering point retrieval (hereafter may be called "interface for retrieval") 420. The application program 410 corresponds to the application program 1A in FIG. 1. Examples of the application program 410 are data base, customer management program and document creation program.

The interface for retrieval 420 corresponds to the recovery point retrieval request issuing section 1B and recovery instruction section 1C in FIG. 1. The interface for retrieval 420 can instruct a search of a recovery point to the storage control device 20, and also can instruct recovery with specifying the selected recovery point. Search of the recovery point is instructed to the storage control device 20 as the retrieval request 600. This retrieval request 600 corresponds to the retrieval request D1 in FIG. 1. The recovery point search result is sent to the host 10 as the recovery point candidate list 700. This candidate list 700 corresponds to the candidate list D2 in FIG. 1.

The file controller 100 comprises, for example, a file R/W processing section 430, partial restore processing section 440, data retrieval processing section 450, journal read function 460 and temporary restoring area 540.

The file R/W processing section 430 is for reading and writing data at the file level according to the access request from the host 10. The partial restore processing section 440 restores only the recovery target file specified by the retrieval request 600 for each update history, and stores the restored file in the temporary restoring area 540. The data retrieval processing section 450 checks whether a temporarily restored specified file group matches the retrieval conditions in the retrieval request 600. The data retrieval processing section 450 specifies the period where the file group matches the retrieval conditions, and sends this specified period to the host 10 as the recovery point candidate list 700. The journal read functions 460 will be described later.

The temporary restoring area 540 corresponds to the "temporary restoring area", and corresponds to the temporary restoring area V3 in FIG. 1. This temporary restoring are 540 is used for temporarily restoring the range specified as the recovery target out of the entire range of the user data volume 510. The temporary restoring area 540 can be structured as the above mentioned logical volume, or can be created as a virtual volume in the memory 120 of the file controller 100.

The block controller 200 may comprise, for example, a block R/W processing section 470, journal creation processing section 480, restore processing section 490 and journal access function 461. The block R/W processing section 470 is for reading/writing data at the block level. The journal creation processing section 480 creates and manages journal data when the data stored in the user data volume 510 is updated. The journal data is stored in the journal volume 520. The restore processing section 490 restores the stored contents of the user data volume 510 up to the recovery point instructed from the interface for retrieval 420. The restored stored contents is stored in the volume for restoring 530.

The journal read function 460 and journal access function 461 are functions for the file controller 100 to acquire journal data from the journal volume 520. The journal read function 460 in the file controller 100 can access the journal volume 520 via the journal access function 461 in the block controller 200. The partial restore processing section 440 acquires a predetermined journal data from the journal volume 520 via the journal read function 460 and journal access function 461, and performs partial restoring. The journal read function 460 and journal access function 461 can be called the "journal data acquisition function (acquisition section) for the file controller to acquire journal data via the block controller".

The disk enclosure 300 comprises, for example, a user data volume 510, journal volume 520 and volume for restoring 530. The user data volume 510 corresponds to the "data volume", which corresponds to the user data volume V1 in FIG. 1. The journal volume 520 corresponds to the "journal volume" or the "volume for update data management", which corresponds to the journal volume V2 in FIG. 1. The volume for restoring 530 is used to recover the entire user data volume 510 to the status at the recovery point specified by the user.

Now the configuration of the journal volume 520 will be described with reference to FIG. 6. The journal volume 520 is roughly divided into the journal record area 521 and the data area 522. The journal record area 521 is a management area for managing the journal data. The data area 522 is an area for storing the journal data.

Figure 6:
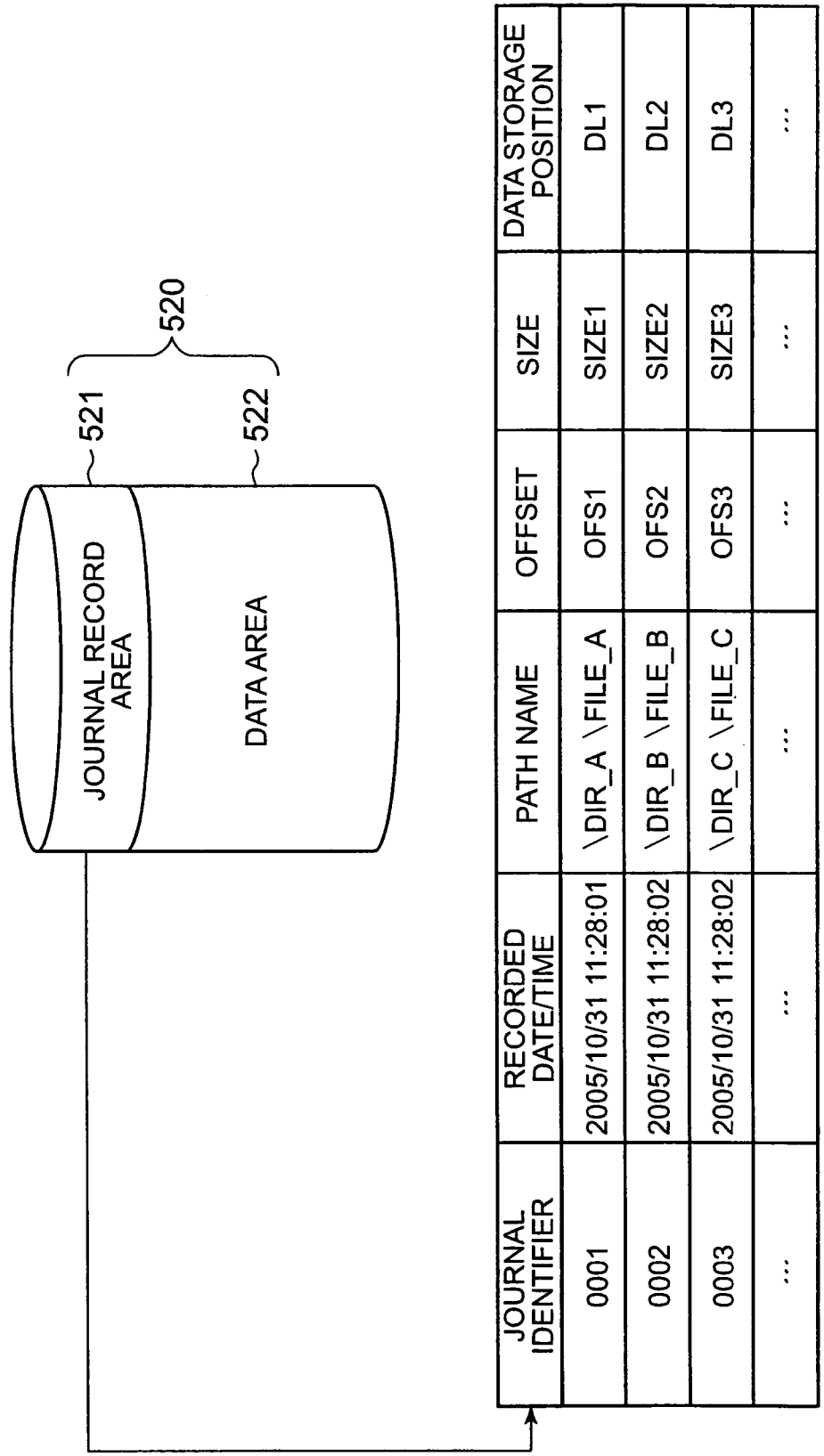
FIG. 6 is a diagram depicting the configuration of the journal volume and journal record.

The table in FIG. 6 shows the configuration example of the journal record area 521. The journal record area 521 is created by corresponding the journal identifier, recorded date and time, path name, offset, size and data storage position, for example, for each data update of the user data volume 510.

The journal identifier is an identification information for uniquely identifying a data update in the storage control device 20. The journal identifier is a serial number, for example, and the number increments by one each time the user data volume 510 is updated. The recorded date and time is the date and time when the journal data was stored in the journal volume 520, that is, the information to indicate the date and time when the data update of the user data volume 510 was performed.

The path name is a file identification information for specifying the updated file. The path name indicates a path on the file system to reach the updated file from the route directory (top directory). The offset is an address information to indicate the position of the updated data in the file. The size is an update volume information to indicate the size of the updated data. The data storage position is a storage destination address information to indicate a position where the updated data (data just before the update) is stored in the data area 522.

Figure 7:
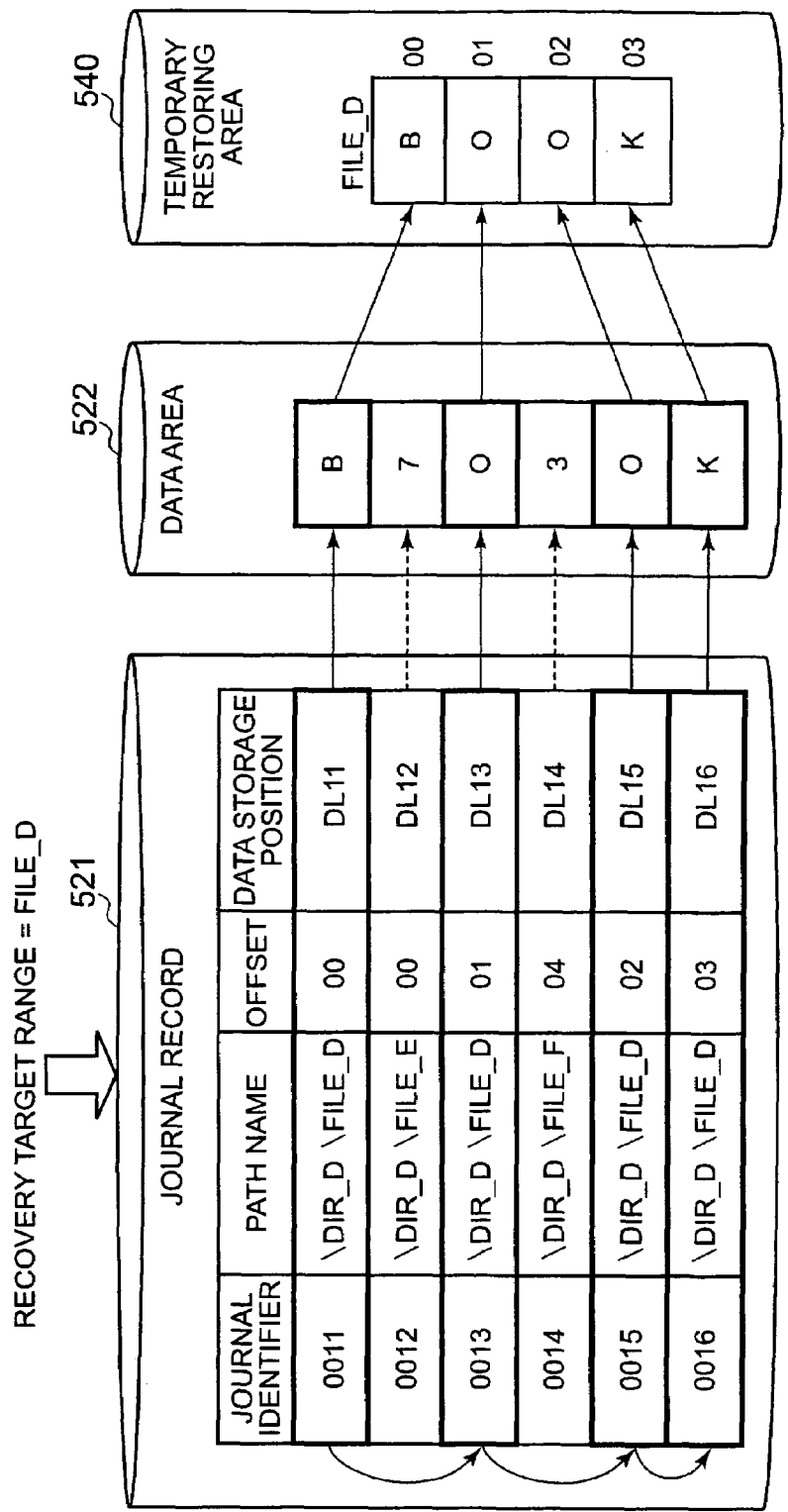
FIG. 7 is a diagram depicting the status of restoring only the specified files.

FIG. 7 is a diagram depicting the status of performing partial restoring using journal data. For convenience of explanation, it is assumed here that "FILE_D" is specified as the recovery target range.

The partial restore processing section 440 sequentially searches the "path name" of the journal record from the beginning to the end of the journal record area 521. And when a journal record on the file name "FILE_D" is detected, the partial restore processing section 440 refers to the data storage position, reads the data from the data area 522, and stores it in the temporary restoring area 540. The partial restore processing section 440 places the read data in the position of an "offset" address.

In the case of the example shown in FIG. 7, data "B" is read from the journal identifier "0011", data "O" is read from the journal identifiers "0013" and "0015" respectively, and data "K" is read from the journal identifier "0016", and are stored in the temporary restoring area 540 according to the offset address of the file. By this, file "FILE_D" having the word "BOOK" is reproduced in the temporary restoring area 540.

Since each journal data has only the updated data of the file, a meaningful key word cannot be discovered in each journal data itself. However the partial restore processing section 440 restores the data in target file units specified as the recovery target, so the later mentioned key word retrieval can be performed.

Also the partial restore processing section 440 partially restores the contents of the user data volume 510 only for the files specified as the recovery target, as mentioned above. Even if this specified file is related to other files in the user data volume 510, the partial restore processing section 440 restores only the target files specified as the recovery target, without considering the relationship and dependency among files.

Also as mentioned later, a plurality of recovery target ranges can be specified in the retrieval request 600. Therefore even if specific files relate to each other, the user can specify related files, and restore them respectively.

Figure 8:
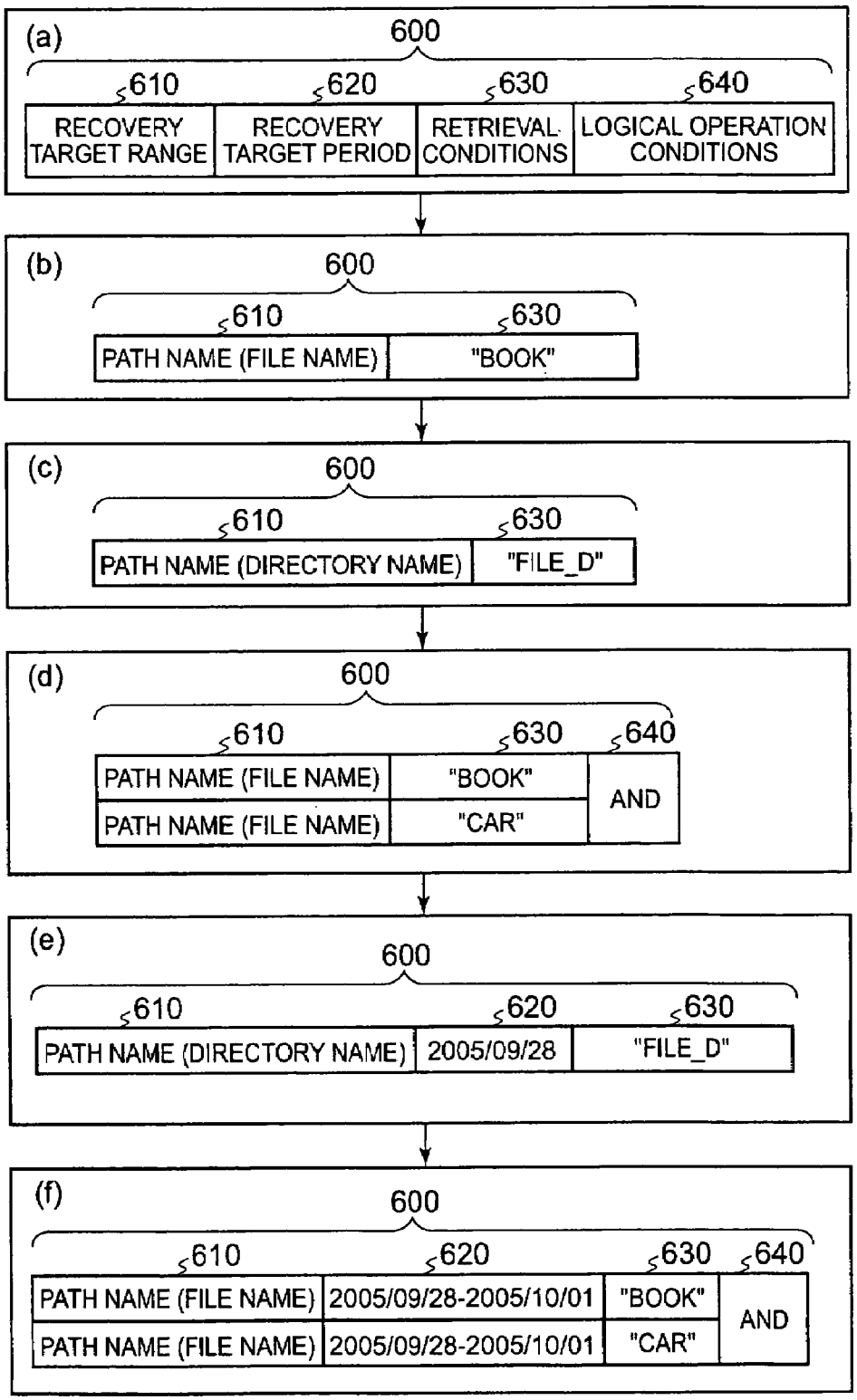
FIG. 8 is a diagram depicting the configuration of the recovery point retrieval request.

FIG. 8 is a diagram depicting a configuration example of the retrieval request 600. As FIG. 8A shows, the retrieval request 600 is comprised of, for example, the recovery target range 610, recovery target period 620, retrieval conditions 630 and logical operation conditions 640. Besides these, retrieval request identification information to identify each retrieval request 600 and transmission destination address are created, and are sent from the host 10 to the storage control device 20.

It is not necessary to set significant values (effective value, character string) for all of this information 610 to 640. It is sufficient if significant values are set at least for the recovery target range 610 and retrieval conditions 630. For the other information 620 and 640, it is sufficient if an effective value is set when this information is used.

For the recovery target range 610, a path name for specifying a target file (including directory) is set. The recovery target period 620 is used for a later mentioned example, and if time based conditions of the recovery target file can be specified, the value to indicate the time is set. For the retrieval conditions 630, an arbitrary character string, data and time stamp of the file, which the user selects or inputs, are set. For the logical operation condition 640, the logical operation expression, such as an "AND" condition and "OR" condition, is set.

As FIG. 8B shows, the retrieval request 600 can be generated by setting a path name of the file in the recovery target range 610, and an arbitrary key word is set in the retrieval conditions 630. By issuing such a retrieval request 600, time where the target file includes a predetermined key word can be detected.

As FIG. 8C shows, the path name of the directory may be set in the recovery target range 610, and the file name may be set in the retrieval conditions 630. By issuing such a retrieval request 600, a lost file which is supposed to exist in a predetermined directory can be detected.

As FIG. 8D shows, a plurality of pairs of a recovery target range 610 and retrieval conditions 630, and the logical operation conditions 640 between these pairs may be set. By issuing such a retrieval request 600, a period, when files including different key words satisfy predetermined logical operation conditions, can be detected.

As FIG. 8E shows, a plurality of pairs of a recovery target range 610 and recovery target period 620 and retrieval conditions 630, and the logical operation conditions 640 between these pairs may be set. By issuing such a retrieval request 600, a period, when files including different key words satisfy predetermined logical conditions, can be detected, just like FIG. 8D. In the case of the example shown in FIG. 8E, the recovery target period 620 is set, so the partial restore processing range by the partial restore processing section 440 can be narrowed down in a time period, and partial restore processing can be performed faster.

Figure 9:
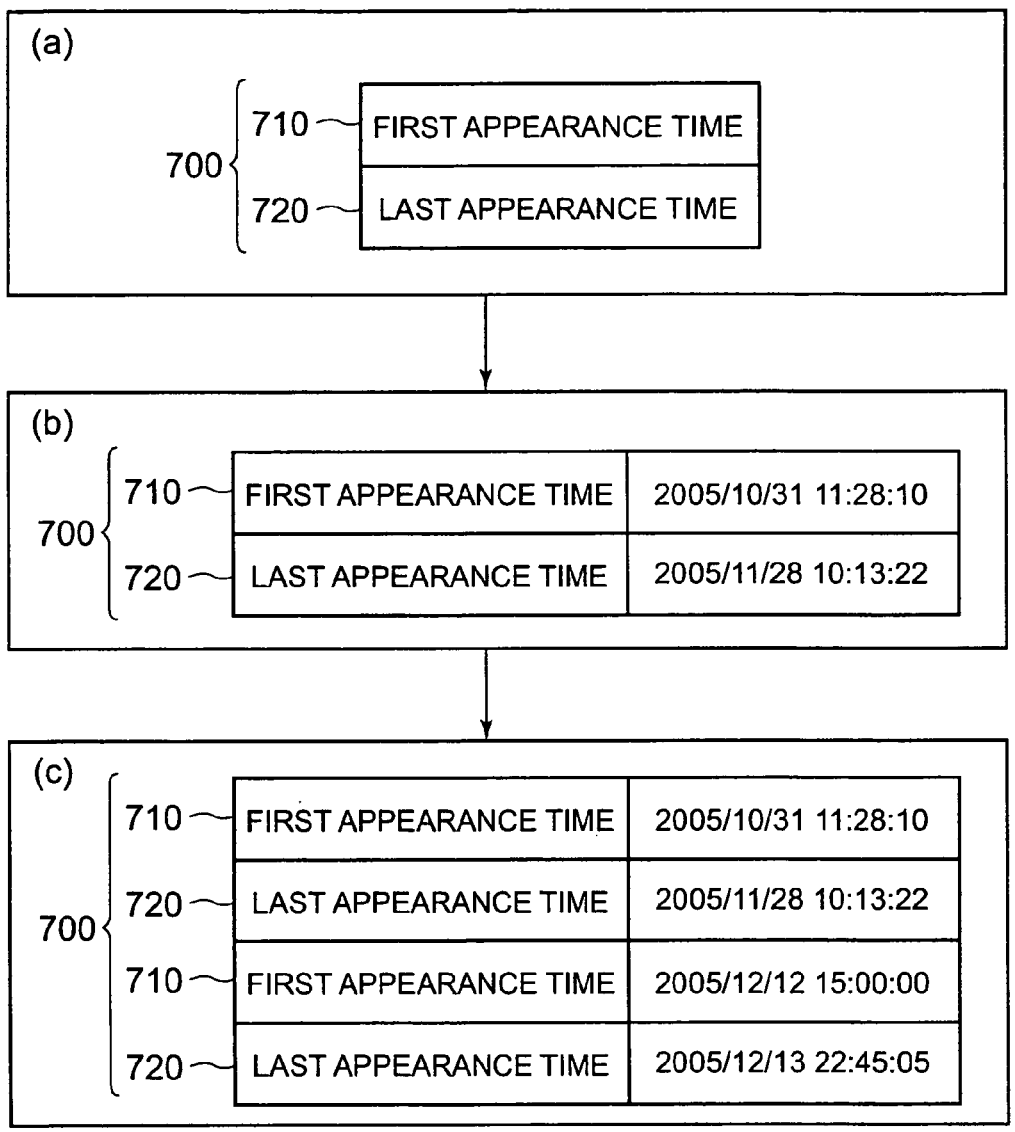
FIG. 9 is a diagram depicting the configuration of the recovery point candidate list.

FIG. 9 is a diagram depicting a configuration example of the recovery point candidate list 700. As FIG. 9A shows, the recovery point candidate list (hereafter may be called "candidate list") 700 is comprised of, for example, the first appearance time 710 and the last appearance time 720.

The first appearance time 710 is a first point (time) when the recovery target file satisfies the retrieval conditions. The last appearance time 720 is a point when the recovery target file satisfies the retrieval conditions the last time. For example, if a file created at certain time Tf is deleted at time T1, the first appearance time 710 is Tf, and the last appearance time 720 is T1. One first appearance time 710 and one last appearance time 720 form one pair. By this pair of 710 and 720, the period when the recovery target file satisfies the retrieval conditions is shown.

As FIG. 9B shows, the first appearance time 710 and the last appearance time 720 can be expressed in a year, month, day, hour, minute and second format. By expressing with this format, the user can understand the period intuitively.

Instead of this, a value of a counter timer, which counts up a predetermined amount every day, may be used. In other words, the value of the counter timer in the storage control device 20 may be set in the candidate list 700. Even if the value of the counter timer is used, the value can be converted into the format of year, month, day, etc. when it is displayed in the interface for retrieval 420.

As FIG. 9C shows, the candidate list 700 may include a plurality of pairs of the first appearance time 710 and the last appearance time 720. For example, this is the case when the recovery target file satisfies the retrieval conditions at a certain time, then the data is updated and no longer matches the retrieval conditions, and then data is updated again and satisfies the retrieval conditions again. In this case, the candidate list 700 includes all the periods when the recovery target file matches the retrieval conditions.

In this way, the candidate list 700 specifies the start time (first appearance time 710) when the recovery target file satisfies the retrieval conditions, and the end time (last appearance time 720), and expresses the period of matching the retrieval conditions by the first appearance time 710 and the last appearance time 720. By this, the period of matching the retrieval conditions can be specified by a relatively small data volume. However the present invention is not limited to this, and may include all the points when the recovery target file matches the retrieval conditions in the candidate list 700. For example, if a file is updated at times T1, T2, T3, T4, T5, . . . respectively, and satisfies the retrieval conditions at times T1, T2 and T3, then all of the times T1, T2 and T3 can be included in the candidate list 700. In the case of the example in FIG. 9, only T1 and T3 are included in the candidate list 700.

Figure 10:
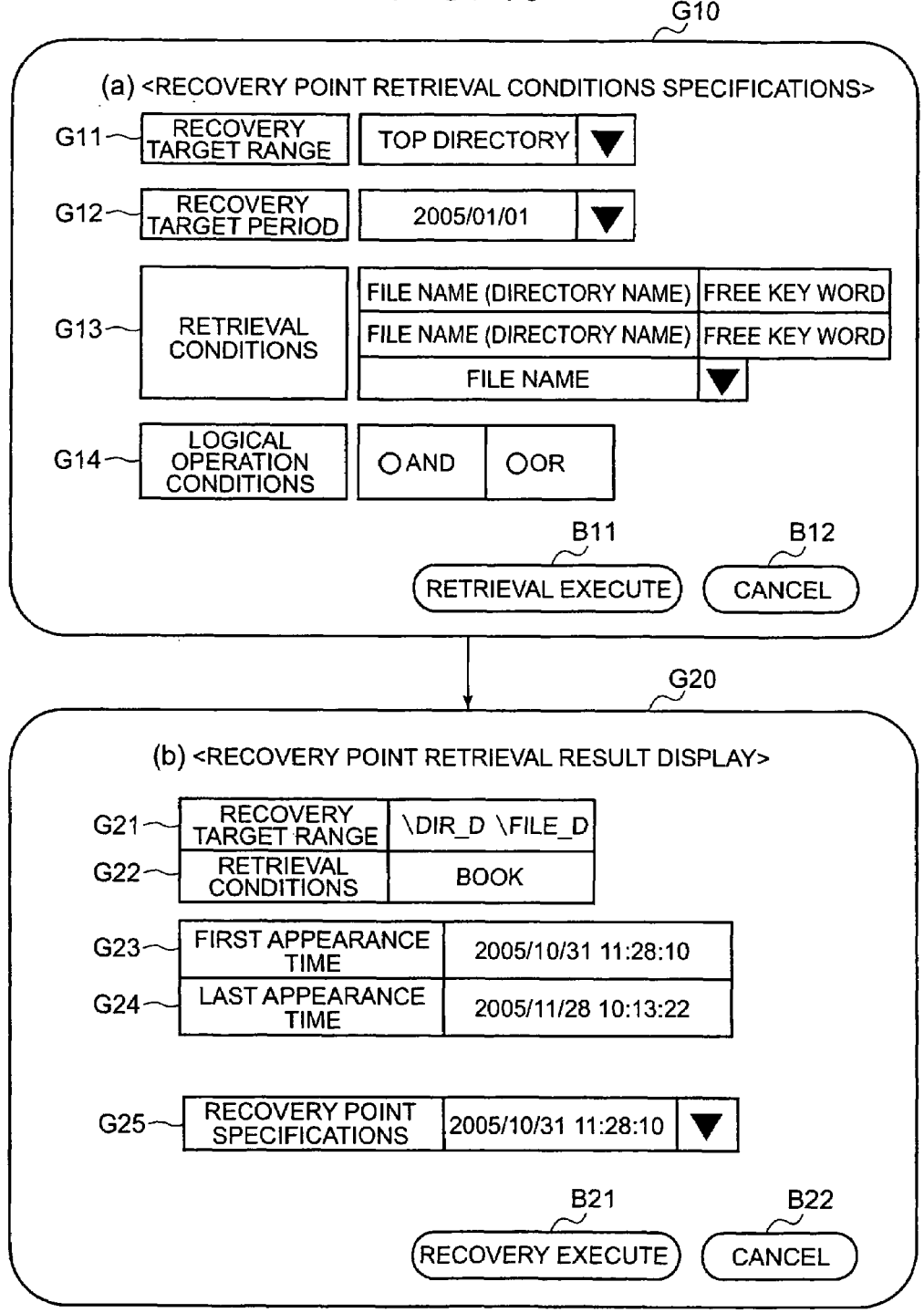
FIG. 10 is a diagram depicting a recovery point retrieval request issuing screen (a) and a recovery point candidate list display screen (b)

FIG. 10 is a diagram depicting an example of the user interface which the interface for recovery point retrieval 420 provides to the user. FIG. 10A is a screen G10 for issuing the recovery point retrieval request 600. This screen G10 can be called the "recovery point retrieval conditions specification screen" or the "recovery point retrieval request issuing screen", for example.

The retrieval conditions specification screen G10 can include the recovery target range specification section G11, recovery target period specification section G12, retrieval conditions specification section G13, logical operation conditions specification section G14, retrieval execution button B11 and cancel button B12.

The recovery target range specification section G11 is for the user to specify a file of which recovery is desired. In this specification section G11, each directory under the top directory is displayed in a so called "pull down menu format", so as to select a desired file.

The recovery target period specification section G12 is for specifying the time period where the recovery target file is restored. In this specification section G11, the search target time period range can be selected in pull down menu format.

The retrieval conditions specifications section G13 is for specifying the key word and the file name that the recovery target file is supposed to have. The user can input an arbitrary character string (alphanumeric, symbol, etc.). The user can specify all or a part or the data of the selected file as retrieval conditions by selecting a file name in pull down menu format. The data of the file itself may be specified as a retrieval condition, so that the recovery point before infection can be searched for a file infected by a computer virus, as a later mentioned example shows.

The logical operation conditions specification section G14 is for specifying such logical operation conditions as AND and OR. The retrieval execution button B11 is for issuing the retrieval request 600 where the values specified in G11 to G14 are set. The cancel button G12 is for canceling the issuing of the retrieval request 600.

FIG. 10B shows a screen G20 for displaying the recovery point retrieval result (search result). This retrieval result screen G20 is generated based on the recovery point candidate list 700 transmitted from the storage control device 20 to the host 10.

The retrieval result screen G20 can be comprised of, for example, the recovery target range display section G21, retrieval conditions display section G22, first appearance time display section G23, last appearance time display section G24, recovery point specification section G25, recovery execution button B21 and cancel button B22.

The recovery target range display section G21 is for displaying a file name specified by the above mentioned recovery target range specification section G11. The retrieval conditions display section G22 is for displaying the retrieval conditions specified by the above mentioned retrieval conditions specification section G13. If the recovery target period and logical operation conditions are also specified on the screen G10, the specification of the recovery target period and the logical operation conditions can also be displayed on the screen G20.

The first appearance time display section G23 is for displaying a value being set for the first appearance time 710 in the candidate list 700. In the same way, the last appearance time display section G24 is for displaying the value being set for the last appearance time 720 in the candidate list 700.

The recovery point specification section G25 is for specifying the recovery point desired by the user. For example, the user can select one desired recovery point out of a plurality of recovery point candidates displayed in the pull down menu format, for example.

The recovery execution button B21 is a button for restoring the stored content of the user data volume 510 up to the recovery point specified by the user. The cancel button B22 is a button for canceling execution of restoring. The screen shown in FIG. 10 and the description thereof are just an example, and the present invention is not limited to the above configuration.

Now operation of the storage system will be described with reference to FIG. 11 to FIG. 13. Each flow chart to be described herein below shows an overview of processing, and is different from an actual computer program. In the description of flow charts, a step is indicated by "S".

Figure 11:
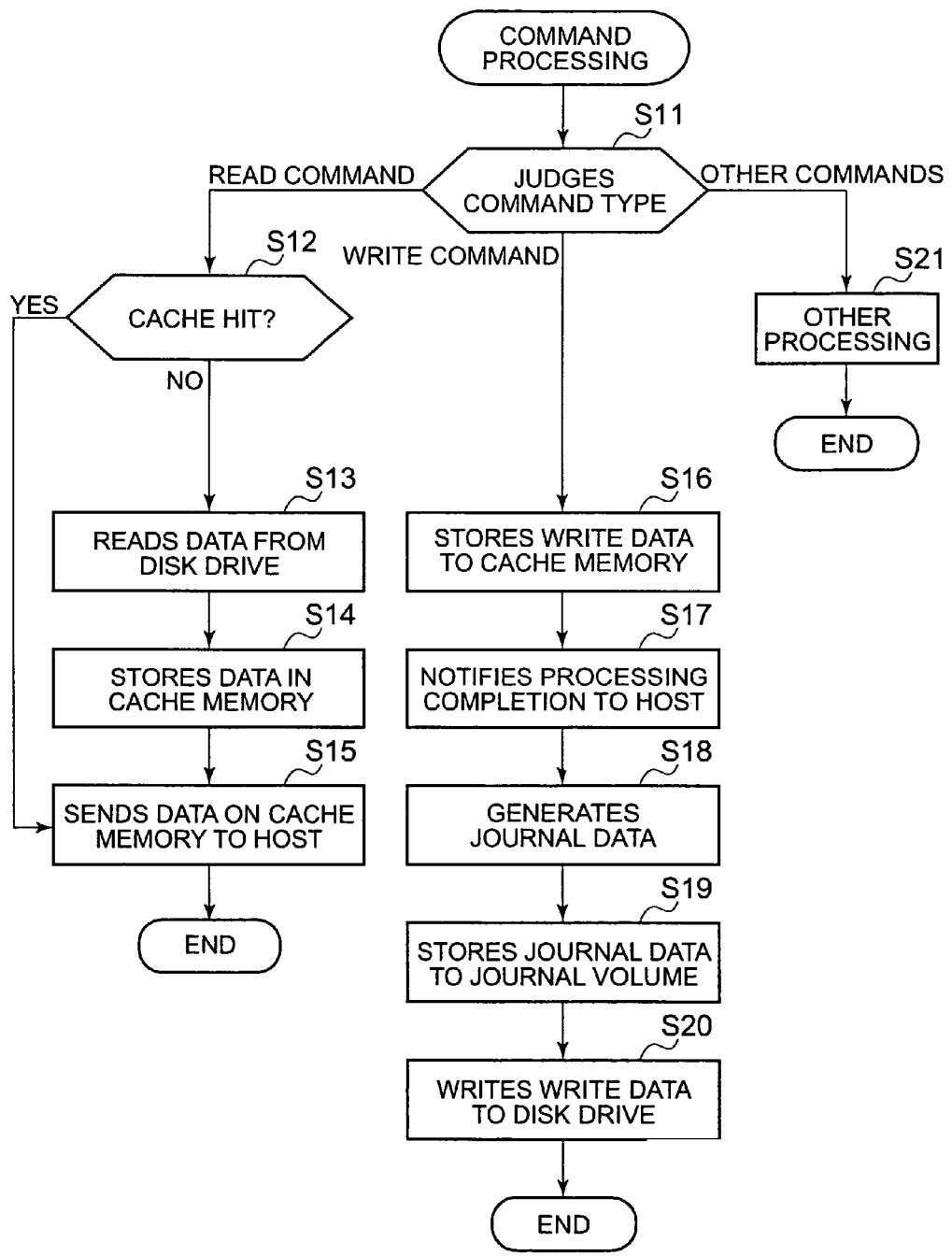
FIG. 11 is a flow chart depicting the command processing.

FIG. 11 is a flow chart depicting the command processing for the storage control device 20 to process the access request from the host 10. The host 10 can request an update of data using a write command (write request), or request to read data using the read command (read request). As mentioned above, command processing is performed by the cooperation of the file controller 100 and block controller 200, but for convenient explanation, the storage control device 20 will be described here as the main device of the processing.

When a command is received from the host 10, the storage control device 20 judges the type of command (S11). If the received command is a read command, the storage control device 20 judges whether the data requested from the host 10 is stored in the cache area of the memory (hereafter also called cache memory) (S12).

If the data requested from the host 10 is stored in the cache memory (S12: YES), the storage control device 20 reads the data from the cache memory and sends it to the host 10 (S15). If the data requested from the host 10 is not stored in the cache memory (S12: NO), then the storage control device 20 reads the data requested from the host 10 from the disk drive 310 (S13). The storage control device 20 stores this read data in the cache memory (S14), then sends it to the host 10 (S15).

If a write command is received from the host 10, the storage control device 20 secures the area for storing the write data in the cache memory, and stores the write data in this secured area (S16). The storage control device 20 stores the write data in the cache memory, then notifies the completion of processing of the write command to the host 10 (S17).

The storage control device 20 generates the journal data based on the data update by the write command (S18), and stores the generated journal data in the journal volume 520 (S19). In other words, every time the host 10 updates the stored content of the user data volume 510, journal data is generated and stored.

The storage control device 20 stores the write data stored in the cache memory in a predetermined disk drive 310 at an appropriate timing (S20). The predetermined disk drive 310 is a disk drive having a storage area corresponding to the address indicated by the write command.

After storing the write data in the cache memory, the completion of processing of the write command is notified to the host 10 before writing the write data to the disk drive 310, so the response performance of the storage control device 20 can be improved. However the present invention is not limited to this, but completion of processing of the write command may be notified to the host 10 after storing the write data to the disk driver 310.

If the command received from the host 10 is neither a write command nor a read command, the storage control device 20 performs processing according to the command (S21). An example of such a command is an inquiry command to inquire the status of the storage control device 20.

Figure 12:
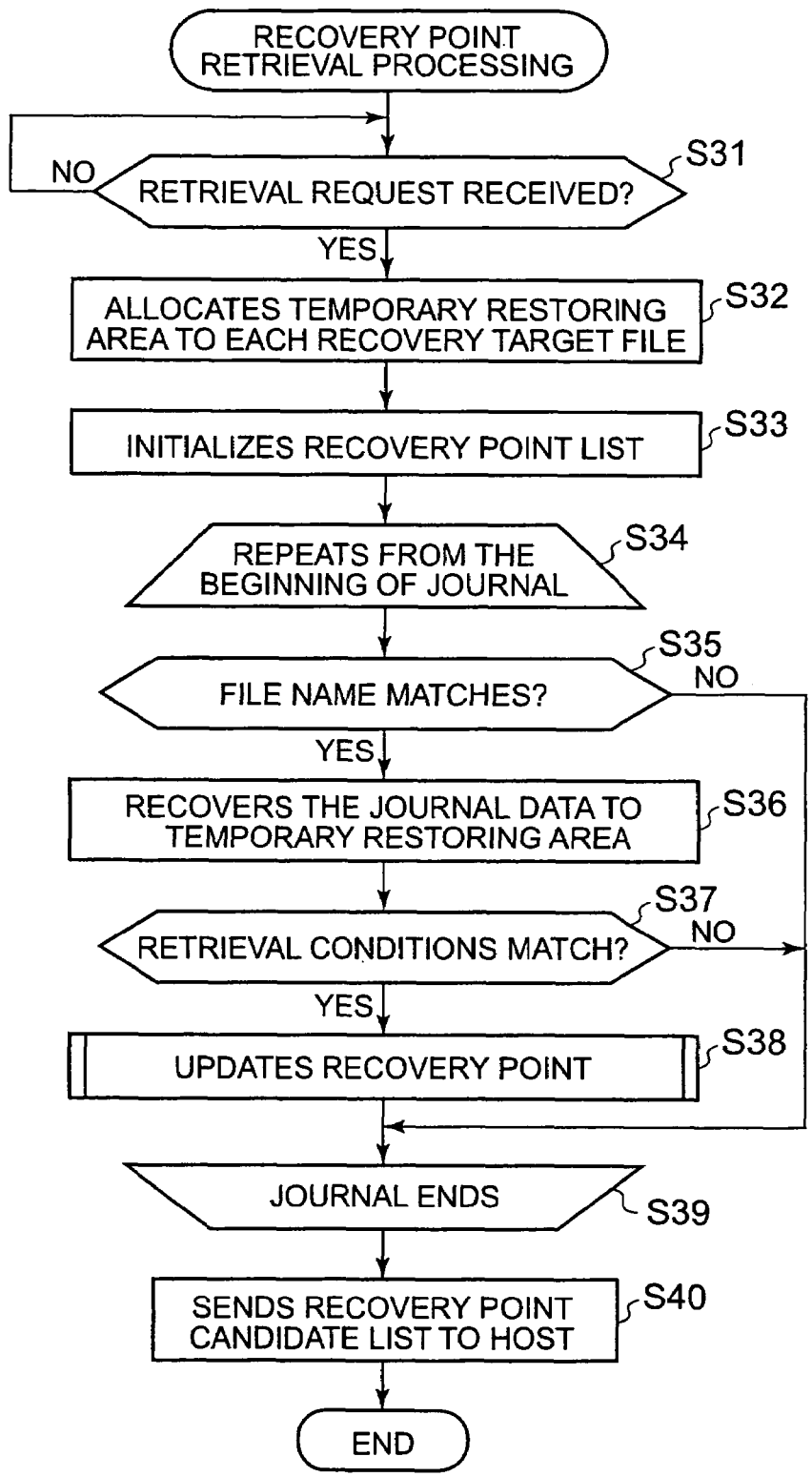
FIG. 12 is a flow chart depicting the recovery point retrieval processing.

FIG. 12 is a flow chart depicting the processing for retrieving the recovery point. The storage control device 20 judges whether the recovery point retrieval request 600 was issued from the host 10 or not (S31). If the retrieval request 600 was issued (S31: YES), the storage control device 20 secures a temporary restoring area 540 for each recovery target file indicated by the retrieval request 600, and allocates one temporary.restoring area 540 to each file (S32).

Then the storage control device 20 initializes the recovery point list (S33). The recovery point list is a temporary operation file for detecting the first appearance time and the last appearance time. One recovery point list is provided for each temporary restoring area 540 respectively.

The storage control device 20 repeats the following processing sequentially from the beginning to the end of each journal record of the journal record area 521 described in FIG. 6 (S34, S39). The storage control device 20 compares the file name (path name) recorded in this journal record and the file name (path name) indicated by the retrieval request 600 for one journal record read from the journal record area 521 (S35).

If both file names match (S35: YES), the journal data managed by the journal record is read from the data area 522, and is stored in the temporary restoring area 540 (S36).

The storage control device 20 judges whether the file restored in the temporary restoring area 540 matches the retrieval conditions indicated by the retrieval request 600 (S37). If it matches the retrieval conditions (S37: YES), the storage control device 20 stores the update time of the temporary restored file (recorded date and time in the journal record) in the recovery point list (S38). The processing to update the recovery point list will be described later with reference to a different drawing.

In this way, the storage control device 20 searches whether the file matches the retrieval conditions while restoring only the recovery target files. It may be searched whether the file matches the retrieval conditions after all the recovery target files are restored.

The storage control device 20 completes the restore processing and retrieval processing for all the journal records on the recovery target files, then sends the recorded contents of the recovery point list to the host 10 as the candidate list 700 (S40).

Figure 13:
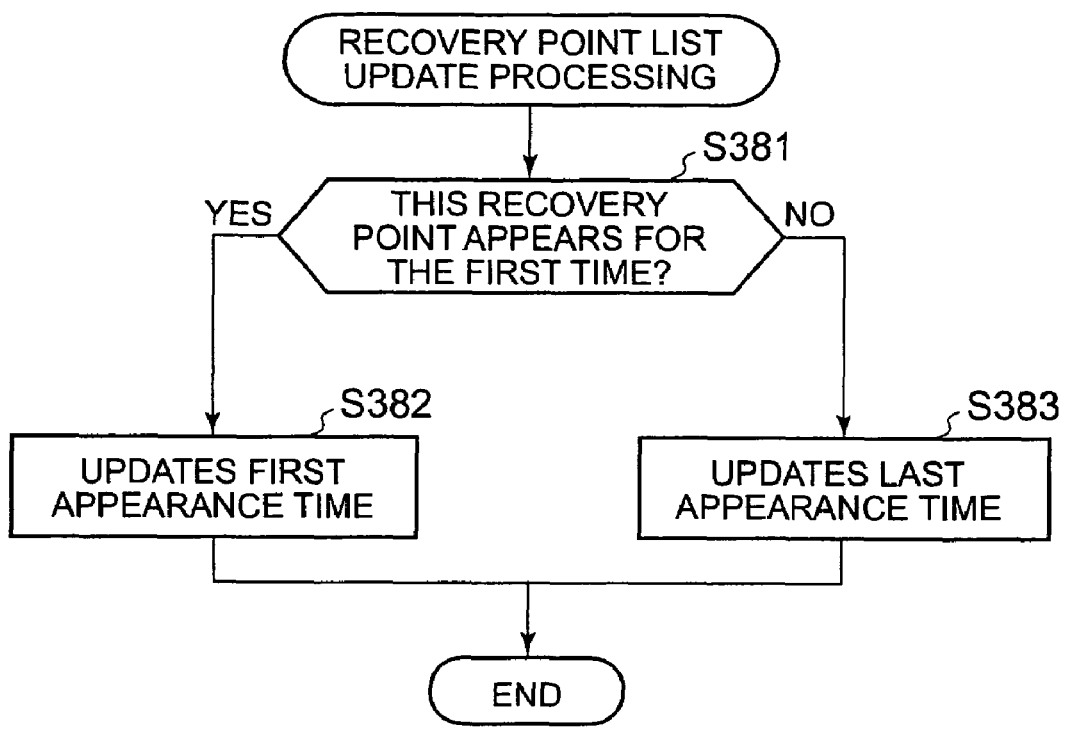
FIG. 13 is a flow chart depicting the recovery point list update processing in FIG. 12.

FIG. 13 is a flow chart depicting the recovery point list update processing shown by S38 in FIG. 12. If a file matching the retrieval conditions is detected, the storage control device 20 judges whether the update time (that is recovery point) of this file appeared for the first time (S381). If the update time is the update time which appeared for the first time (S381: YES), the storage control device 20 records the update time in the recovery point list as the first appearance time (S382). If the update time is not the time which appeared for the first time (S381: NO), the storage control device 20 records the update time in the recovery point list as the last appearance time (S383). The last appearance time in the recovery point list is updated each time a new update time is detected.

The present example structured as above exhibits the following effect. In the present example, the interface for recovery point retrieval 420 is installed in the host 10 for issuing the retrieval request 600. And the storage control device 20 comprises a journal creation processing section 480 for managing the update history of the user data volume 510, a partial restore processing section 440 for restoring only the recovery target files out of all the files stored in the user data volume 510 for each update history based on the retrieval request 600 and storing it in the temporary restoring area 540, and a data retrieval processing section 450 for judging whether the file restored in the temporary restoring area 540-matches the retrieval conditions, and notifying the period matching the retrieval conditions to the host 10 as the recovery point candidate list 700. Therefore in the present example, recovery point candidates can be presented to the user who does not know the recovery points, and operation efficiency can be improved by supporting a selection of appropriate recovery points.

In the present example, the recovery of the user data volume 510 can be requested based on the recovery point candidate list 700. Therefore the user can recover the stored contents of the user data volume 510 to the status in a desired point of time by a relatively simple operation, and operation efficiency improves.

In the present example, the period when the recovery target file matches the retrieval conditions is specified by the first appearance time 710 and the last appearance time 720. Therefore even if the data of the recovery target file is updated frequently, the data volume of the recovery point candidate list 700 can be decreased.

EXAMPLE 2

The second example will now be described with reference to FIG. 14 and FIG. 15. Each example to be described herein below corresponds to a variant form of the first example. In the present example, a hash value of the file is used as the information to specify the file, instead of a path name.

Figure 14:
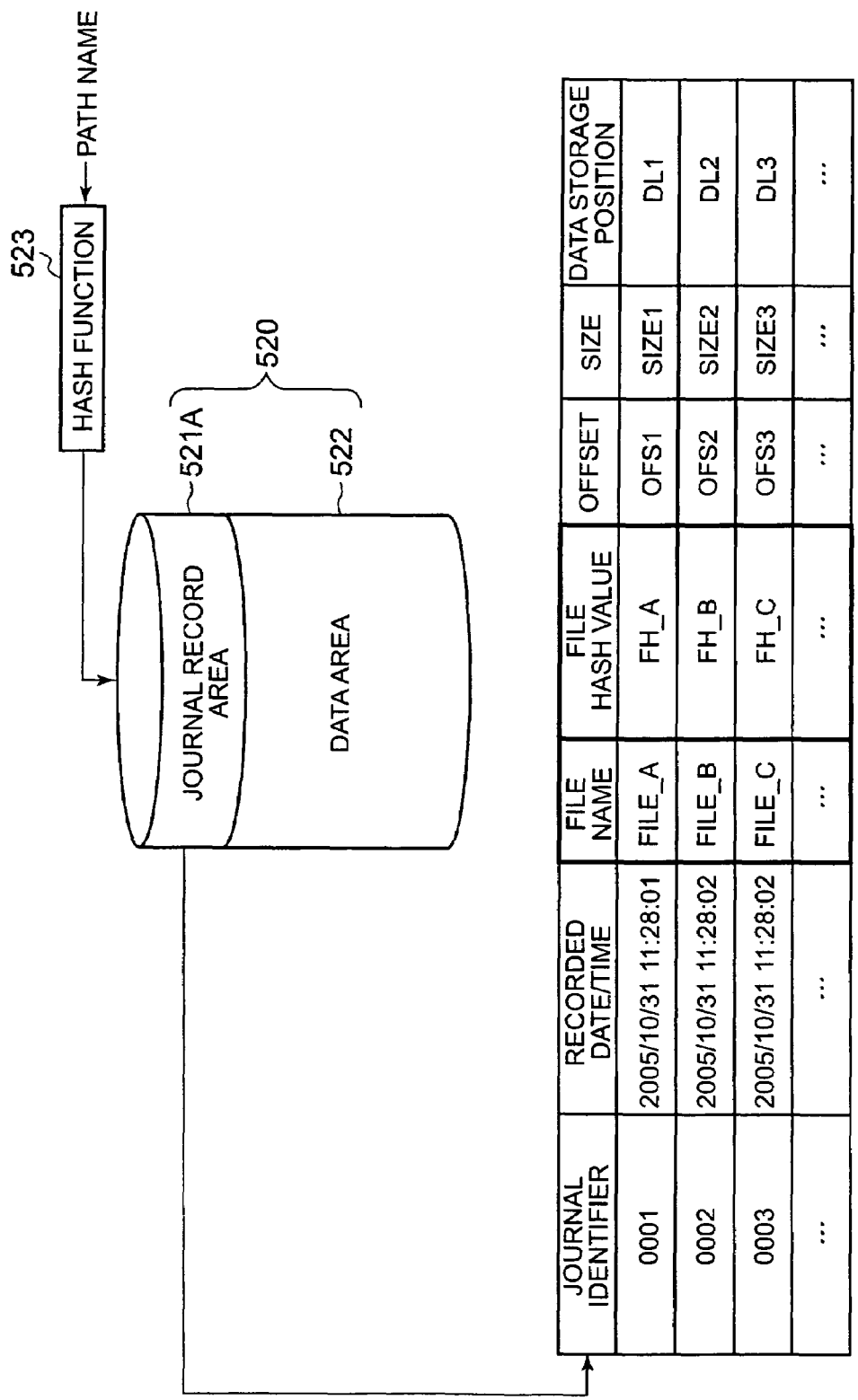
FIG. 14 is a diagram depicting the configuration of the journal record to be used by the storage control device according to the second example.

FIG. 14 is a diagram depicting the configuration of the journal record. In the present example, a combination of a file name (the name of the file which appears at the end of the path) and a hash value is used instead of the path name of the file. The file hash value is acquired by inputting the path name of the file to the hash function 523, for example. In case different files happen to have the same file hash value, a simple file name can also be referred to.

Figure 15:
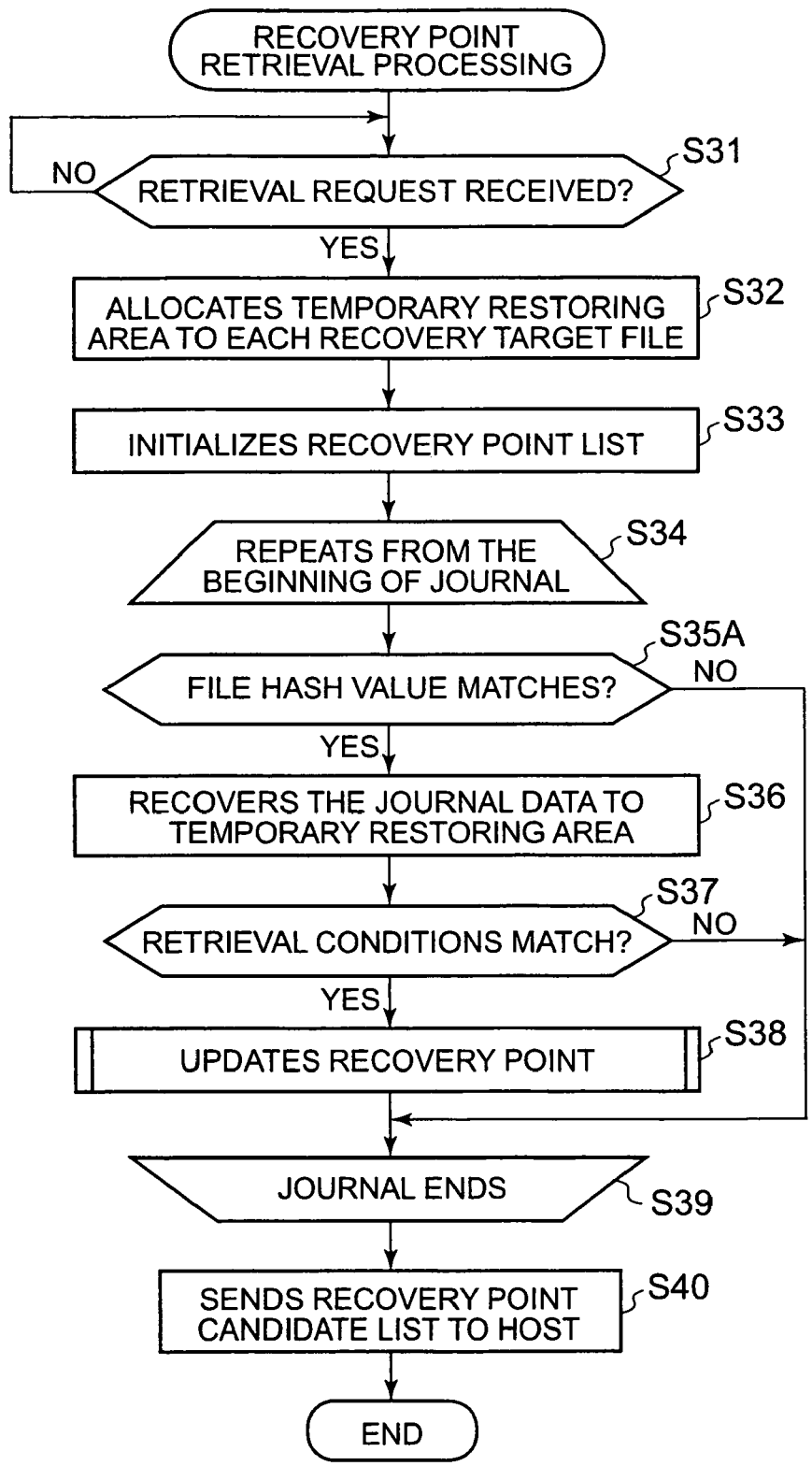
FIG. 15 is a flow chart depicting the recovery point retrieval processing.

FIG. 15 is a flow chart depicting the recovery point retrieval processing according to the present example. This flow chart has steps common to the flow chart in FIG. 12. So description on common steps will be omitted and only the characteristic steps of the present example will be described, that is in the present example, the file hash value recorded in the journal record and the hash value acquired from a file specified as the recovery target are compared, and it is judged whether both of the hash values match (S35A).

In the present example structured in this way, functional effects the same as the first example can be acquired. In addition to this, in the case of the present example which uses a file hash value as the information to specify a file, the data volume can be decreased compared with the case of using a path name (full path) from the top directory too the target file. Therefore the data size of the journal record can be decreased, and journal data can be managed more efficiently.

EXAMPLE 3

Now the third example will be described with reference to FIG. 16 and FIG. 17. In the present example, the file controller 100 and block controller 200 are integrated into a single controller 101.

Figure 16:
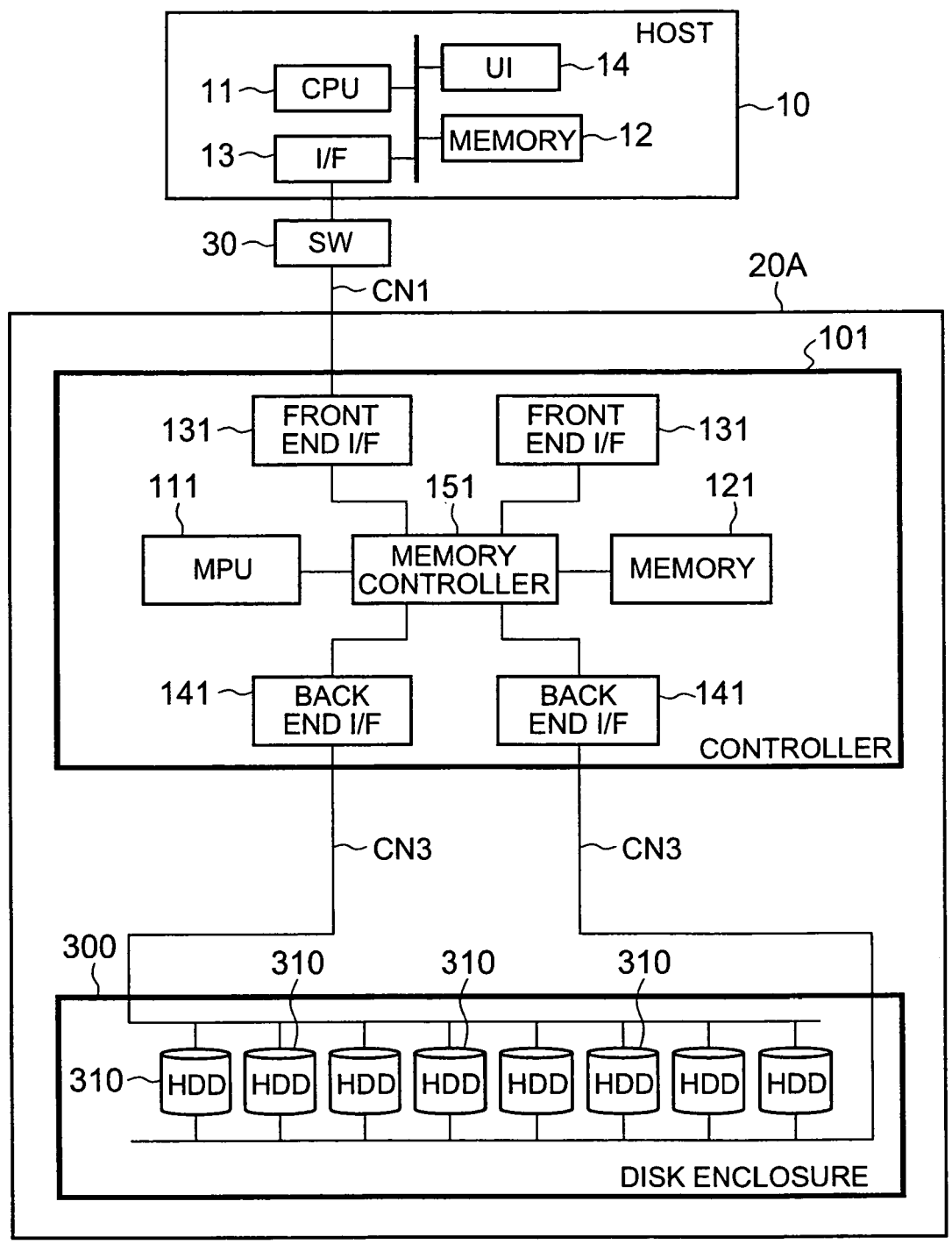
FIG. 16 is a diagram depicting the hardware configuration of the storage system according to the third example.

FIG. 16 is a diagram depicting the hardware configuration of the storage system according to the present example. The storage control device 20A of the present example has a single controller 101. This controller 101 is for implementing the functions of the above mentioned file controller 100 and block controller 200, and can be called the "integrated controller", for example.

Just like the file controller 100, the controller 101 comprises an MPU 111, memory 121, front end I/F 131, back end I/F 141 and memory controller 151. Each of these components is the same as each component 110 to 150 described for the file controller 100.

However this controller 101 performs file level data communication with the host 10 and block level data communication with the disk enclosure 300. Therefore the back end I/F 141 has a function to perform mutual conversion between the logical block address and physical address.

Figure 17:
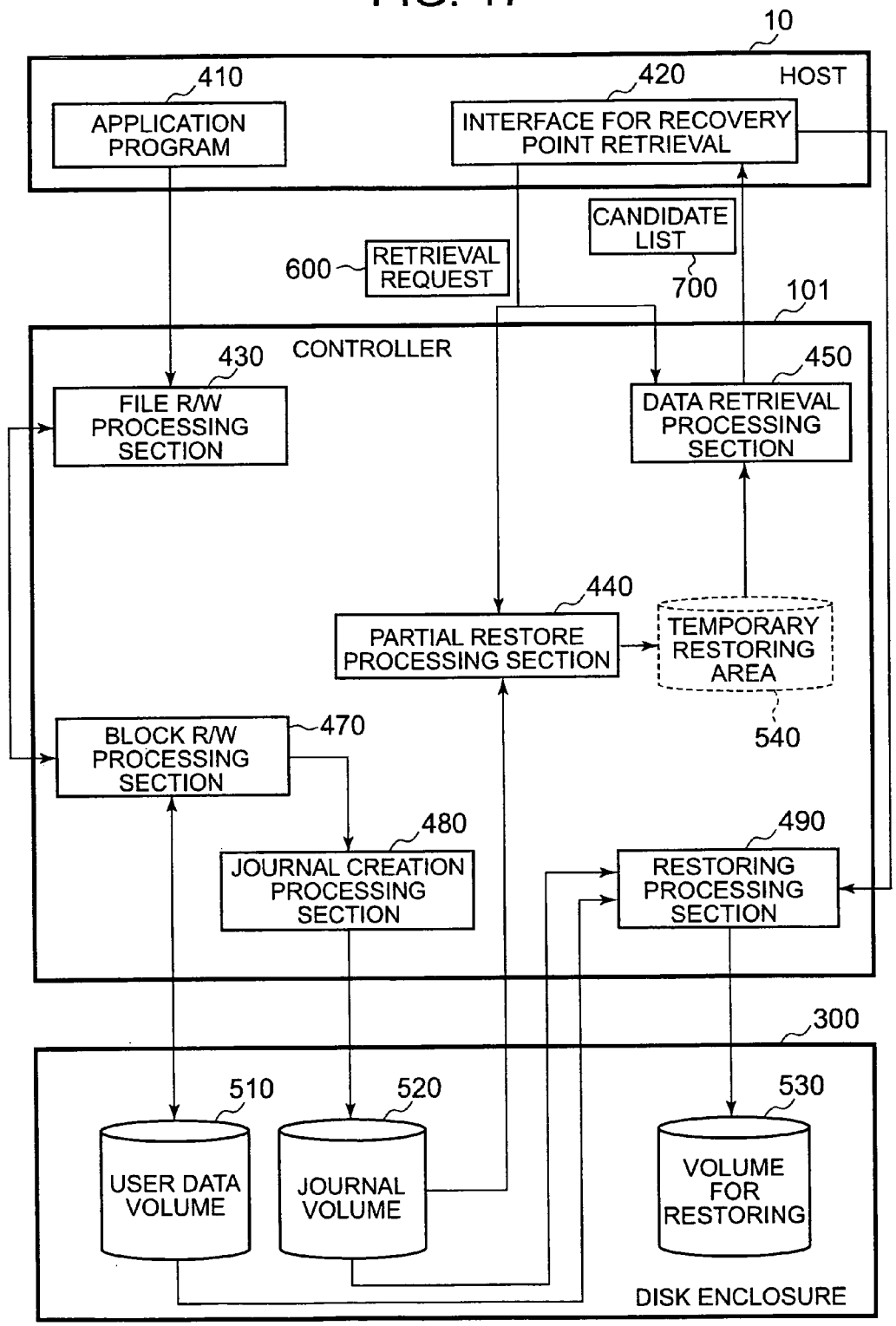
FIG. 17 is a diagram depicting the functional configuration of the storage system.

FIG. 17 is a diagram depicting the functional configuration of the storage system according to the present example. Since the storage control device 20A of the present example has a single controller 101, each processing section 430, 440, 450, 470, 480 and 490 described in the first example are installed inside the controller 101.

Also in the case of the present example which uses a single controller 101, the functions 460 and 461 for the file controller 100 to acquire journal data via the block controller 200 in the first example are unnecessary.

In the present example structured in this way as well, the functional effects the same as the first example can be acquired. In addition to this, in the case of the present example which uses a single controller 101, the number of components can be decreased, and the storage control device 20A can be downsized.

EXAMPLE 4

Now the fourth example will be described with reference to FIG. 18 and FIG. 19. In the present example, the recovery target data can be specified at the block level.

Figure 18:
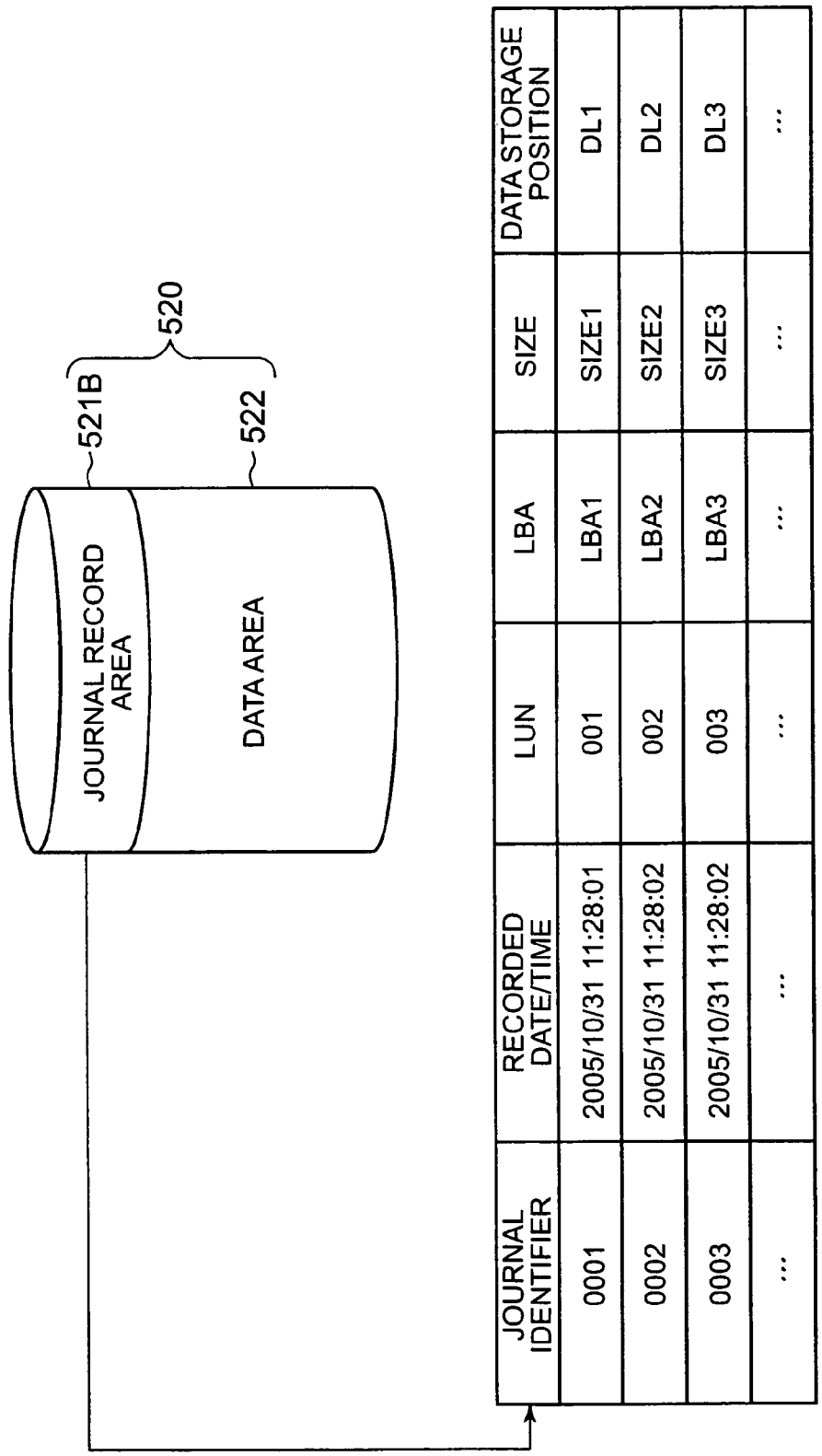
FIG. 18 is a diagram depicting the configuration of the journal record to be used by the storage control device according to the fourth example.

FIG. 18 is a diagram depicting the configuration of the journal record. In the present example, the journal data is specified by the LUN (Logical Unit Number), logical block address (LBA) for indicating offset, and size so that the journal data can be managed in block units. In other words, LUN is the information to specify the user data volume 510, and LBA is an offset value from the first address of the volume.

Figure 19:
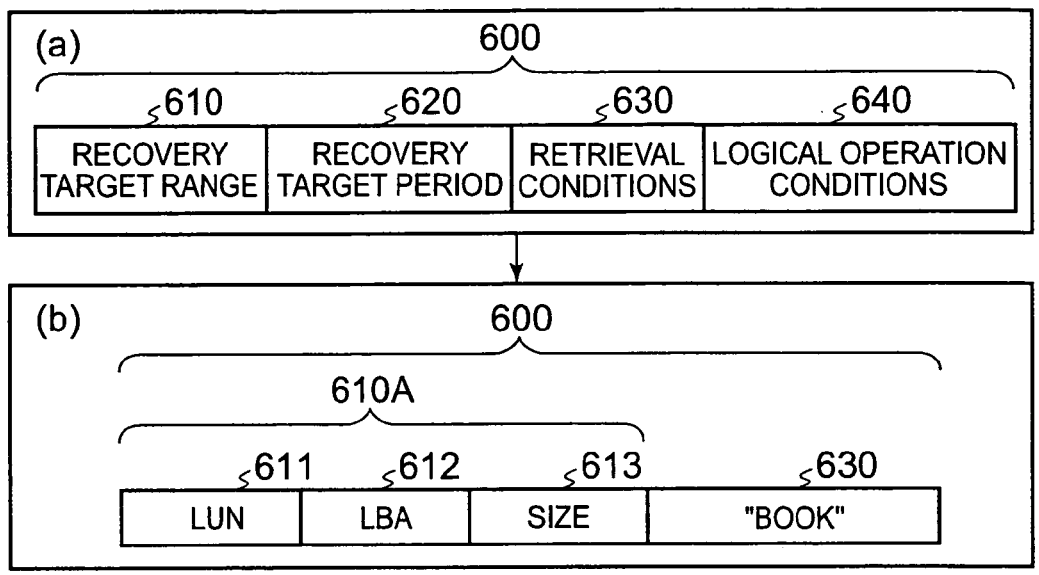
FIG. 19 is a diagram depicting the configuration of the recovery point retrieval request.

FIG. 19 is a diagram depicting a configuration example of the retrieval request 600. In the present example, the recovery target range 610 is comprised of LUN 611, LBA 612 to indicate offset, and data size 613. By this, only a specific block out of the user data volume 510 is restored and checked whether it matches the retrieval conditions.

In the present example structured in this way as well, functional effects the same as the first example can be implemented. In addition to this, in the case of the present example, the recovery target range can be specified at the block level. Also by combining the present example with the first example, the recovery target range can be specified either at the file level or at the block level.

EXAMPLE 5

Figure 20:
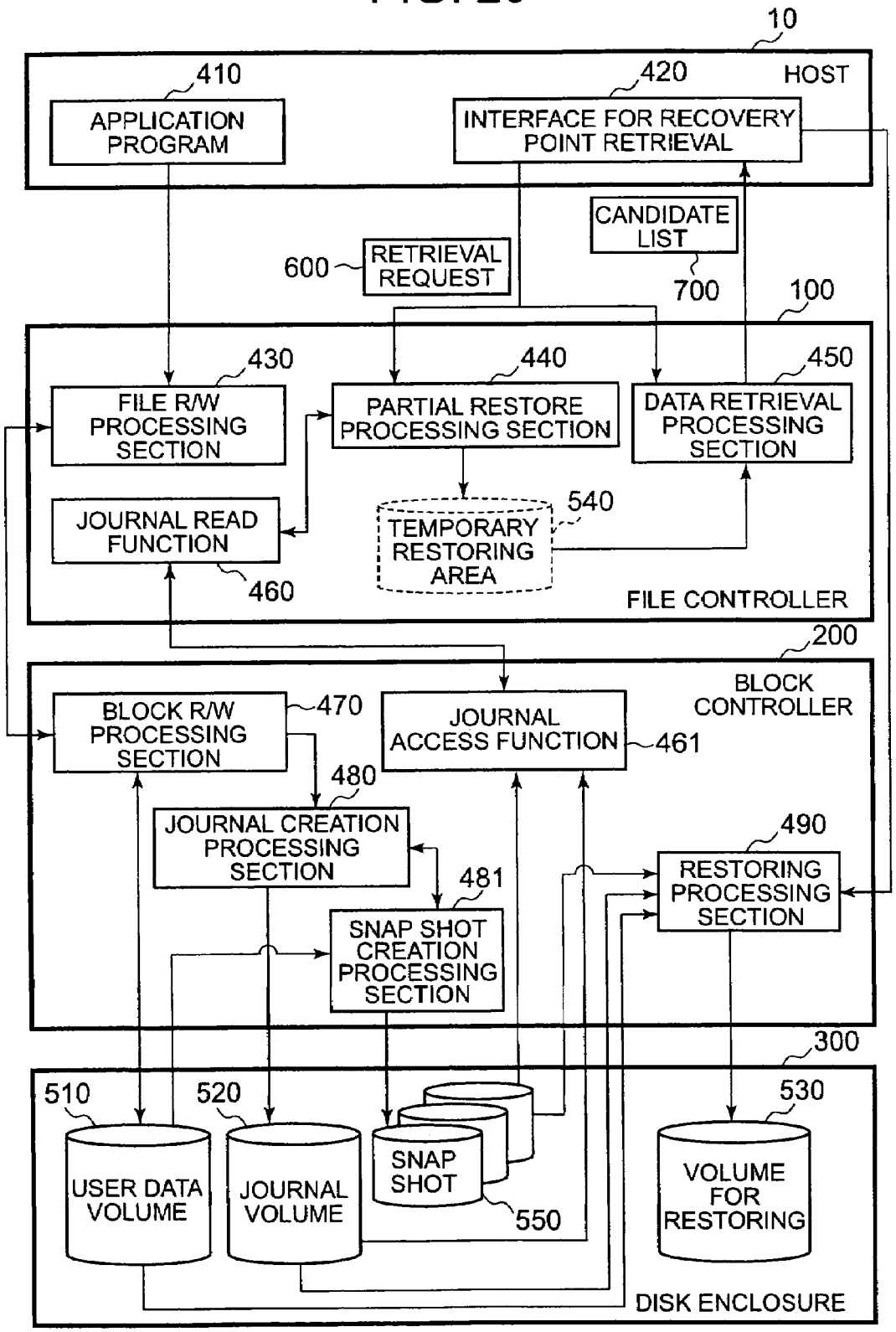
FIG. 20 is a diagram depicting the functional configuration of the storage system according to the fifth example.

The fifth example will now be described with reference to FIG. 20 and FIG. 21. In the present example, a snap shot 550 of the user data volume 510 is created for each predetermined period, so that the user can specify the recovery target period using this snap shot 550 and journal volume 520.

The block controller 200 comprises a snap shot creation processing section 481. This snap shot creation processing section 481 is for creating the stored image of the user data volume 510 at a point of time when the creation of the snap shot was instructed. This stored image is saved as the snap shot 550. The snap shot 550 can be created for each predetermined period, such as every day or every week. The snap shot 550 may be created at an arbitrary time specified by the user.

Figure 21:
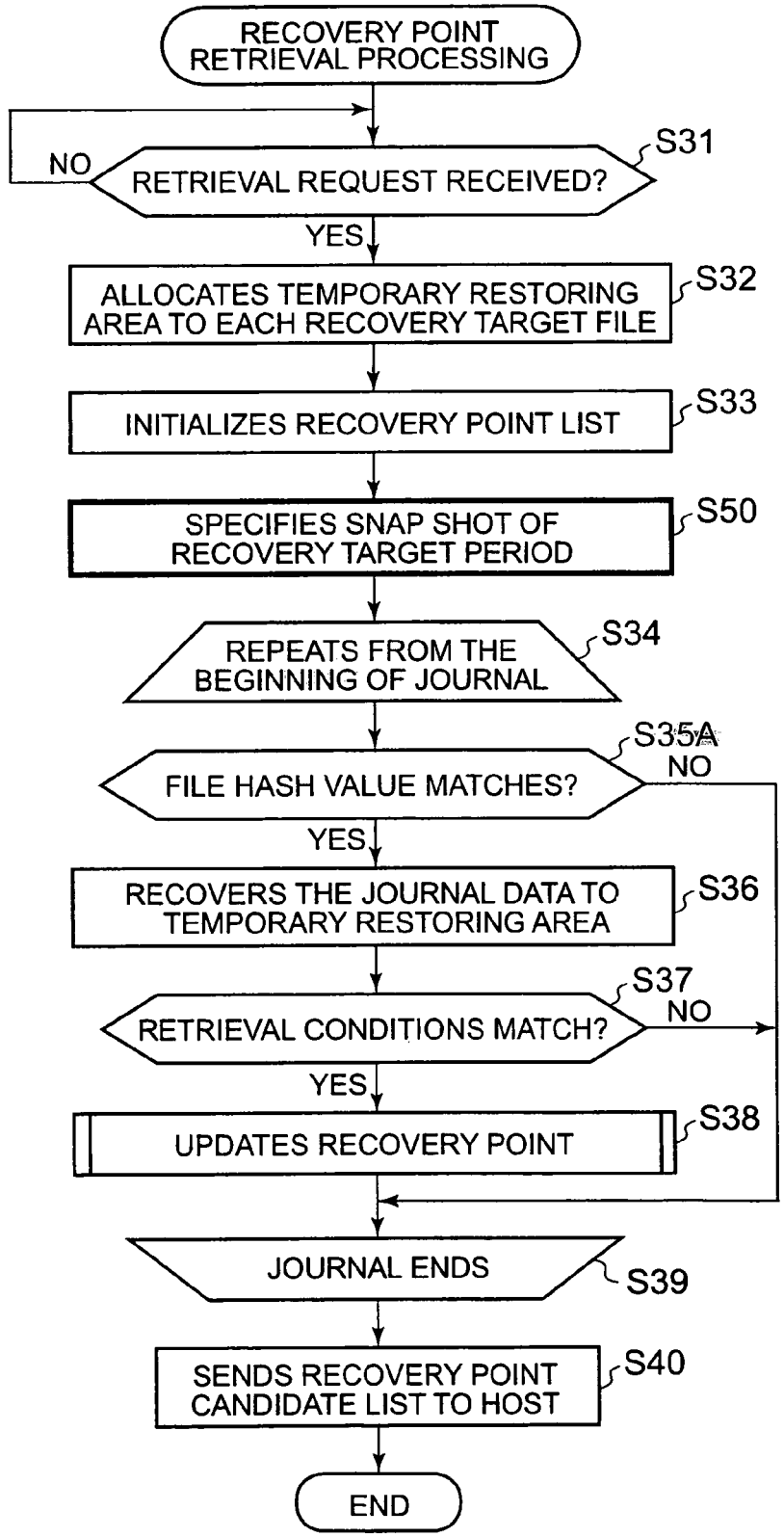
FIG. 21 is a flow chart depicting the recovery point retrieval processing.

FIG. 21 is a flow chart depicting the recovery point retrieval processing according to the present example. Just like the above examples, only the characteristic parts of the present example will be described. It is assumed that an effective value is set in the recovery target period 620 of the retrieval request 600.

After initializing the recovery point list (S33), the storage control device specifies a snap shot 550 corresponding to the recovery target period specified by the user, and detects a journal record group in the recovery target period (S50). Hereafter processing is advanced in the same way as the first example.

In the present example structured in this way as well, functional effects the same as the first example are implemented. In addition to this, in the case of the present example, the period to restore the recovery target file can be specified by combining the snap shot 550 created periodically or non-periodically and journal volume 520. By this, the partial restore processing section 440 and the data retrieval processing section 450 can target less journal records, and recovery point candidates can be detected more quickly.

EXAMPLE 6

Figure 22:
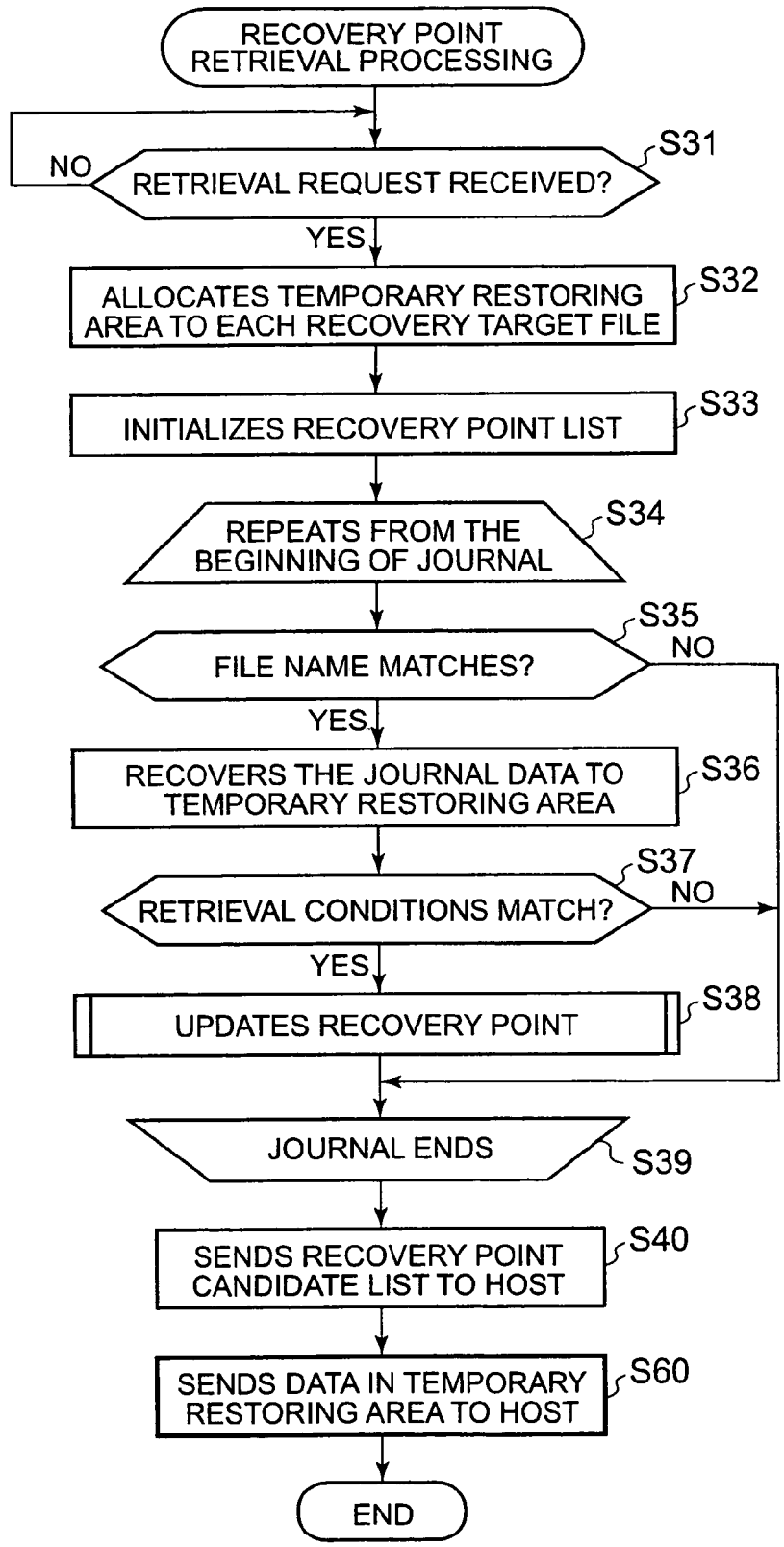
FIG. 22 is a flow chart depicting the recovery point retrieval processing to be executed by the storage control device according to the sixth example.

Now the sixth example will be described with reference to FIG. 22. In the present example, the recovery target file stored in the temporary restoring area 540 can be used by the host 10. FIG. 22 is a flow chart depicting the recovery point retrieval processing.

After sending the recovery point list to the host 10 (S40), the storage control device 20 sends the data in the temporary restoring area 540 (file data or block data) to the host 10 (S60). Therefore the user can refer to the recovery target data before recovering the entire user data volume 510 to the status at a desired recovery point.

In the present example structured in this way as well, functional effects the same as the first example are implemented. In addition to this, in the case of the present example, the data in the temporary restoring area 540 can be confirmed without restoring the entire user data volume 510. Therefore if the user desires only a simple reference of a recovery target data, for example, the user can use the target data without waiting for the completion of restoring of the entire user data volume 510, and operation efficiency improves. Instead of sending data in the temporary restoring area 540 from the storage control device 20 to the host 10, data in the temporary restoring area 540 may be accessed from the host 10. For example, the temporary restoring area 540 created as a virtual volume on the memory may be temporarily mounted on the host 10, so as to be used only for reference.

EXAMPLE 7

Now the seventh example will be described with reference to FIG. 23. In the following examples including the present example, concrete application examples of the first example are shown. The present example is the case when a file of the user infected by a computer virus (hereafter "virus") is recovered to the status before the infection.

Figure 23:
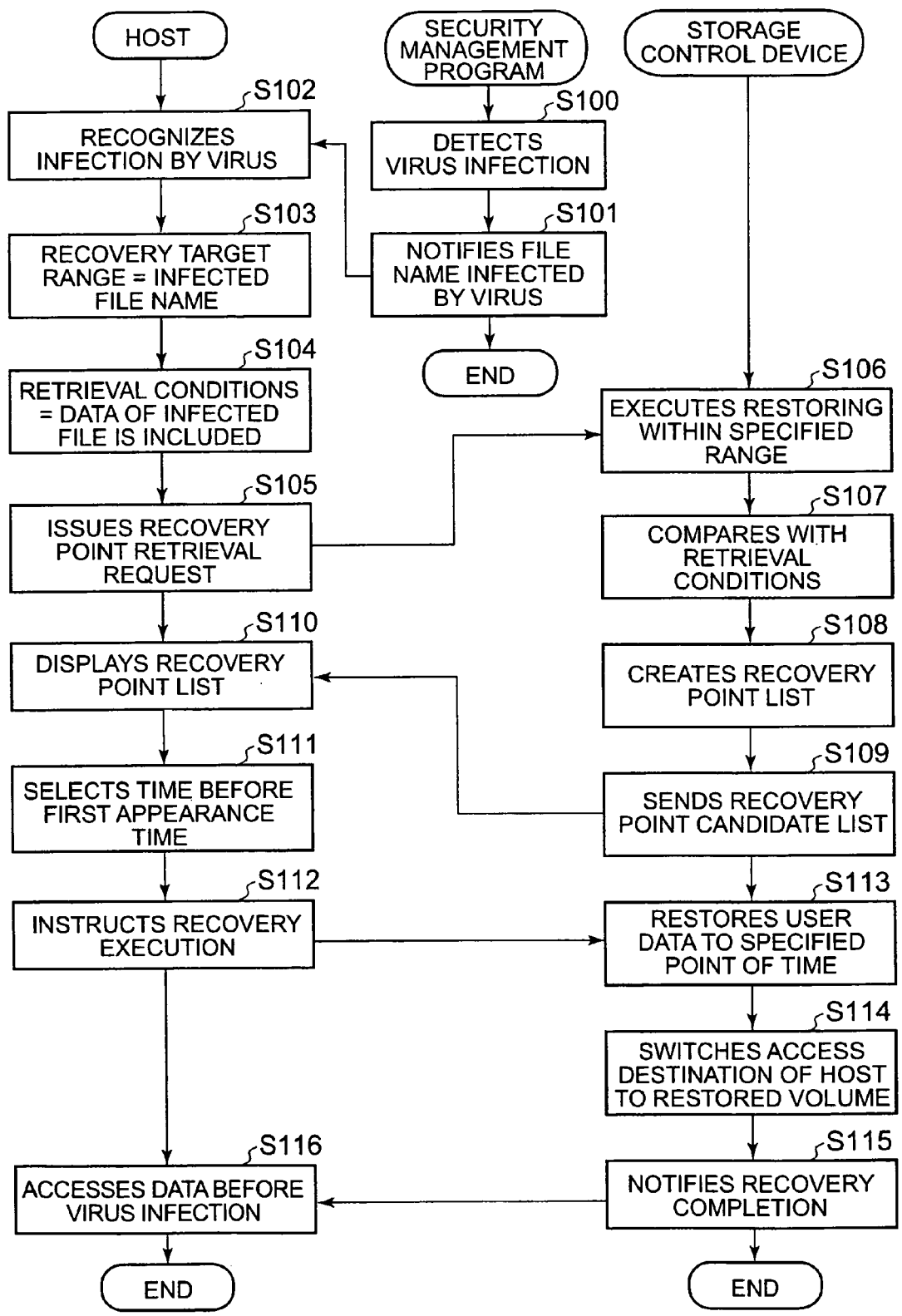
FIG. 23 is a flow chart depicting an application example of the present embodiment.

FIG. 23 is a flow chart depicting the major portion of the general operation of the storage system. The security management program mounted on the host 10 checks whether the file group used by the host 10 is infected by the virus (S100). This check method is known, and is not the subject of the present invention, so detailed description thereof is omitted.

If a file is infected by a virus, the security management program sends a warning to the host 10 with specifying the file name infected by the virus (S101). When this warning is received, the host 10 recognizes the presence of the file infected by the virus (S102).

In the interface for retrieval 420 installed in the host 10, the path name of the infected file is specified in the recovery target range by the user (S103), and the data of the file infected by the virus is specified in the retrieval conditions (S104).

The host 10 issues the retrieval request 600 to indicate the path name of the infected file and infected data (S105). The storage control device 20 restores only for the range specified as the recovery target, as described in the first example (S106), and judges whether the restored file matches the retrieval conditions (S107). Here the file data infected by the virus itself is set as the retrieval conditions, so the file matching the retrieval conditions is the file infected by the virus.

The storage control device 20 creates a recovery point list (S108), and sends the recovery point candidate list 700 to the host 10 (S109). Based on this candidate list 700, the host 10 displays the recovery point candidates (S110). The recovery point candidate list 700 and recovery point list may be collectively called the recovery point list, without making any distinction.

In the host 10, the user selects the time before the first appearance time as the recovery point (S111). This is because the target file is not infected by the virus at the time before the first appearance time. So the host 10 specifies a recovery point before the first appearance time, and requests the restoring (recovery) of the user data volume 510 (S112).

The storage control device 20 restores the stored contents of the user data volume 510 up to the specified recovery point (S113), and sets a path between the volume for restoring 530 and the host 10 (S114). And the storage control device 20 notifies the completion of recovery to the user (S115). By this, the user can use the file in the status before virus infection (S116).

EXAMPLE 8

Figure 24:
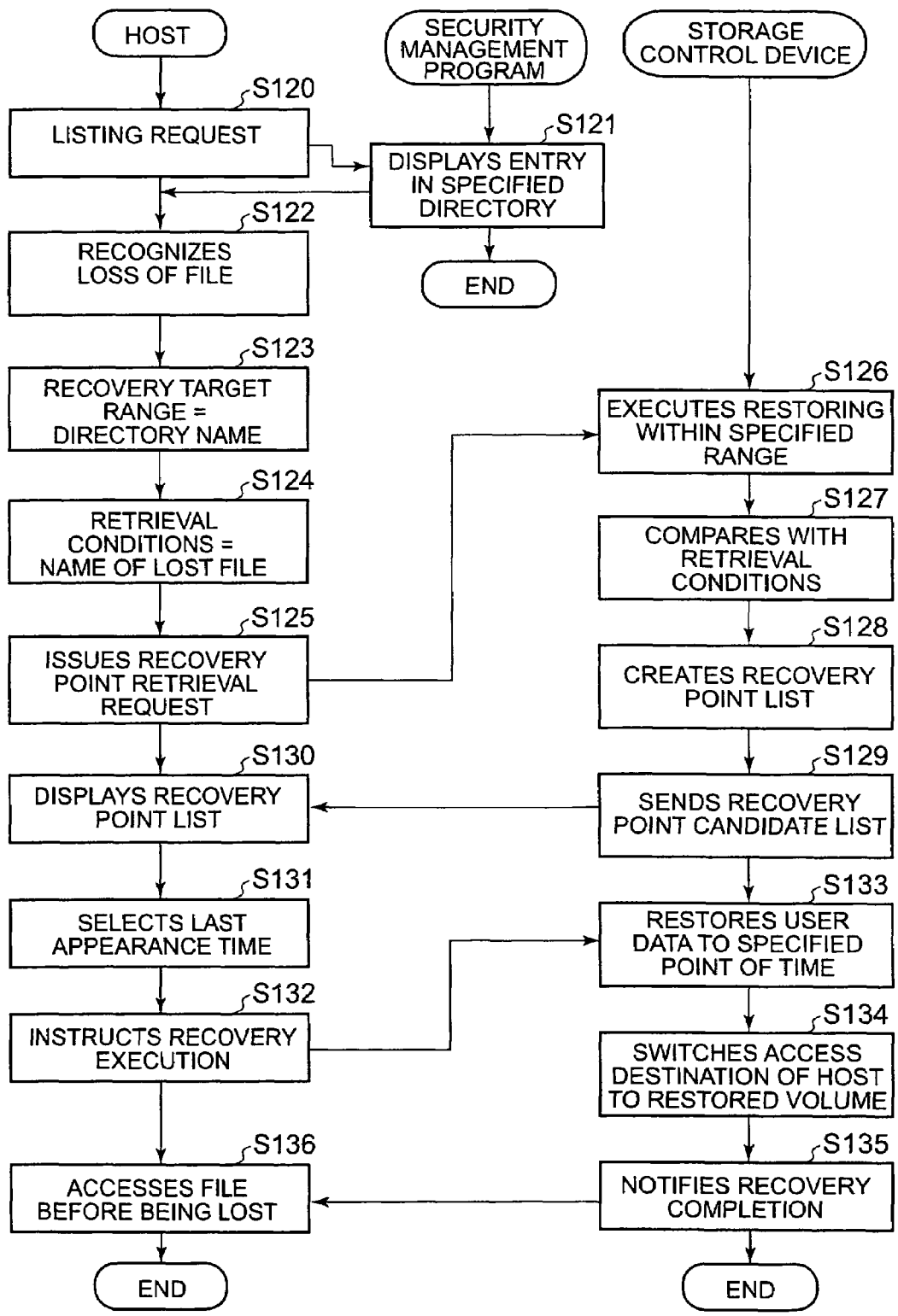
FIG. 24 is a flow chart depicting another application example of the present embodiment.

Now the eighth example will be described with reference to FIG. 24. FIG. 24 is a flow chart depicting the general operation when a file lost by an operation mistake by the user is restored. The user notices that the target file is lost from the file tree. It is assumed that the user can guess the directory name where the target file is supposed to exist.

To use the target file, the user requests the file management program to list a predetermined directory where the target file is supposed to exist (S120). The file management program displays the entry of the specified predetermined directory on the user interface 14 of the host 10 (S121).

The host (user) 10 recognizes that the target file is absent from the predetermined directory (S122). So the host 10 sets the path name of the predetermined directory in the recovery target range and the file name of the lost file in the retrieval conditions respectively (S123, S124), and issues the retrieval request 600 (S125).

Here the file name to be set in the retrieval conditions is not a path name of the lost file, but a simple file name. It is preferable to specify the complete name of the simple file name, but a part of the simple file name may be specified.

The storage control device 20 restores only the file group included in the specified predetermined directory (S126), and checks whether the file group matches the retrieval conditions (S127). And the storage control device 20 creates the recovery point list (S128), and sends the recovery point candidate list 700 to the host 10 (S129).

The host 10 displays the recovery point candidates (recovery point list) on the user interface 14 (S130). The user selects the last appearance time out of the displayed recovery points (S131), and requests restoring of the user data volume 510 (S132). This is because the time when the file desired by the user existed the last time is the last appearance time, and the file was lost immediately after this.

The storage control device 20 restores the stored contents of the user data volume 510 to the status at the specified recovery point (S133), and sets the path between the volume for restoring 530 and the host 10 (S134). The storage control device 20 notifies the completion of restoring to the host 10 (S135). By this, the user can use the file before loss (S136).

EXAMPLE 9

Figure 25:
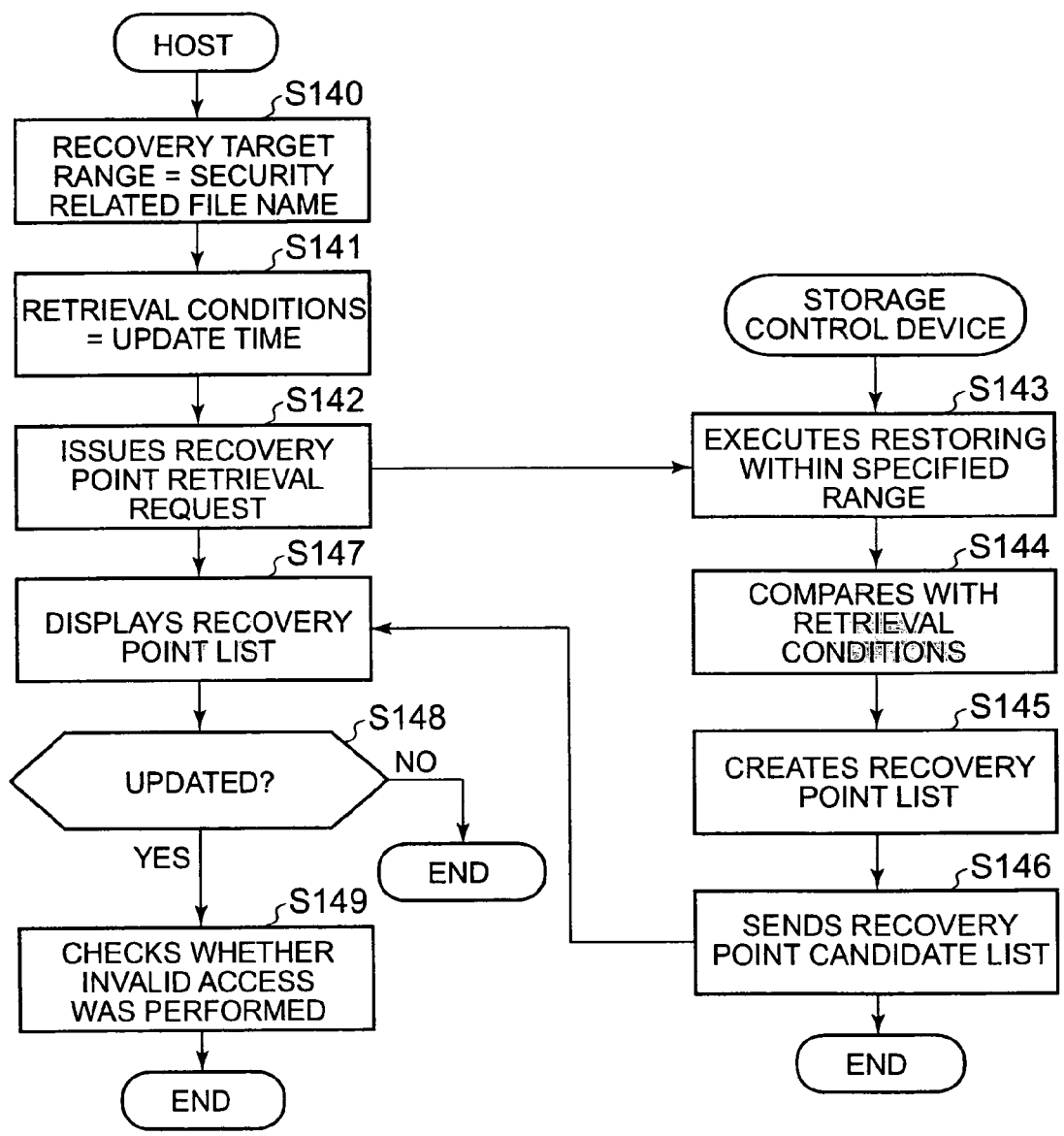
FIG. 25 is a flow chart depicting still another application example of the present embodiment.

Now the ninth example will be described with reference to FIG. 25. FIG. 25 is a flow chart depicting the general operation when invalid access to the host 10 is detected. The host 10 uses one or more security related files. Examples of the security related files are an authentication information file where user authentication information (user ID, password) is recorded, and an access control list for managing the access right to a file. These security related files normally are not updated, and the user having an administrator's right merely refers to them when necessary.

To audit invalid access to the host 10, the user sets the file name (path name) of the security related file in the recovery target range (S140), and sets the file update time in the retrieval conditions (S141). The file update time is specified for detecting whether this security related file was updated. This is because if someone accessed the host 10 invalidly, that individual would overwrite a part of the security related file to hide the evidence of an invalid access.

When the host 10 issues the retrieval request 600, the storage control device 20 restores only the specified security related file (S143), and checks whether the security related file was updated (S144). And the storage control device 20 creates the recovery point list (S145), and sends the recovery point candidate list 700 to the host 10 (S146).

The host 10 displays the detected recovery point on the user interface 14 (S147). The host (user) 10 judges whether the security related file was updated at an unnatural time zone (S148). For example, if the security related file was updated in a time zone when the system administrator is absent (S148: YES), it is possible that the host 10 was invalidly accessed. So the host 10 performs a more detailed security audit using another program (S149).

The present invention is not limited to the above mentioned examples. Experts skilled in the art would make various additions and modifications within the scope of the present invention.

What is claimed is:

1. A storage system comprising
    a host computer including a retrieval request issuing section for issuing a retrieval request specifying at least a restoring target file and a retrieval condition including arbitrary keyword data irrelevant to a timestamp of said restoring target file thereby recovering said restoring target file as existing in a data volume at any arbitrary time point without causing a user to set a recovery time point before issuing the retrieval request; and
    a storage device including the data volume storing data written from the host computer, and a journal volume storing update histories of the data in the data volume, each of the update histories including update time information indicating an update time and update data written to the data volume,
    wherein if said retrieval request does not specify a time point or a time period when the restoring target file is created, updated or deleted, the storage device detects a first appearance time point and a last appearance time point of the restoring target file based upon the restoring target file and the retrieval condition including the arbitrary keyword data, and the storage device sets time points between the first and last appearance time points when the restoring target file is updated as respective candidate recovery time points in a recovery time point candidate list, said first appearance time point is a first time point when the recovery target file satisfies the retrieval condition, said last appearance time point is a last time point when the recovery target file satisfies the retrieval condition, wherein if said retrieval request specifies a time period but not a time point when the restoring target file is updated or deleted, the storage device narrows down respective candidate recovery time points in the recovery time point candidate list to be within said time period, wherein in order for a user to select one desired recovery time point from the respective candidate recovery time points, the storage device sends to the host computer the recovery time point candidate list including the respective candidate recovery time points to be displayed to the user, wherein the host computer sends to the storage device recovery time point information specifying said one desired recovery time point as selected by the user, and wherein the storage device restores at least one restoring target file corresponding to the selected recovery time point by using the update histories, when receiving the recovery time point information from the host computer.

2. The storage system according to claim 1, wherein said host computer further comprises a restoring request issuing section for specifying a predetermined point of time included in said period notified from said retrieval request issuing section, and issuing a restoring request for restoring the stored content of said data volume to the status in said predetermined point of time, and said storage control device further comprises a restoring section for restoring the stored content of said data volume to the status in said predetermined point of time by using relevant update history when said restoring request is received.

3. The storage system according to claim 1, wherein if a plurality of restoring target files are specified in said retrieval request, said storage device provides a temporary restoring area for each of said plurality of restoring target files, and restores the data in said plurality of restoring target files respectively.

4. The storage system according to claim 1, further comprising a update history management section which manages update history in file units, and the restoring target file is specified by a hash value based on path information of the restoring target file.

5. The storage system according to claim 1, wherein said restoring target file is specified by a logical unit number, an offset logical block address, and a data size.

6. The storage system according to claim 1, wherein said storage device comprises:

a first controller for accepting an access request from said host computer in file units and converting the access request in file units into an input/output request in block units; and a second controller for transmitting/receiving data to/from a plurality of storage drives based on an input/output request which is input from said first controller in block units, said first controller comprises:

a first restoring section; a retrieval section; an update history acquisition section for acquiring update history; and a temporary restoring area, and said second controller comprises an update history management section.

7. A storage system according to claim 1, wherein the storage device selects at least one of the candidate recovery points, at which data of the data volume includes the restoring target file satisfies the retrieval condition, as said at least one desired recovery point.

8. A storage system according to claim 1, wherein when at least two respective candidate recovery points are selected as desired recovery points, the storage device sends time information of an earliest recovery point of the desired recovery points and a latest recovery point of the desired recovery points to the host computer.

9. The storage system according to claim 1, wherein the storage device stores only one initial copy of said restoring target file and journal data thereof, and then restores a copy of the said restoring target file only after the user selects said one desired recovery time point.

* * * * *